United States Patent
Zothner

(10) Patent No.: US 6,751,657 B1
(45) Date of Patent: Jun. 15, 2004

(54) SYSTEM AND METHOD FOR NOTIFICATION SUBSCRIPTION FILTERING BASED ON USER ROLE

(75) Inventor: Eric R. Zothner, Apex, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/468,464

(22) Filed: Dec. 21, 1999

(51) Int. Cl.[7] ............ G06F 15/16; G06F 15/177; G06F 15/173; G06F 9/46
(52) U.S. Cl. ............ 709/220; 709/203; 709/206; 709/207; 709/238; 709/318
(58) Field of Search ............ 709/1, 100, 101, 709/200, 201, 202, 238, 203, 206, 207, 217, 219, 220, 318; 705/56

(56) References Cited

U.S. PATENT DOCUMENTS

| | | | | |
|---|---|---|---|---|
| 5,913,032 A | * | 6/1999 | Schwartz et al. | 709/213 |
| 6,085,193 A | * | 7/2000 | Malkin et al. | 707/10 |
| 6,122,633 A | * | 9/2000 | Leymann et al. | 707/10 |
| 6,151,584 A | * | 11/2000 | Papierniak et al. | 705/10 |
| 6,173,310 B1 | * | 1/2001 | Yost et al. | 709/201 |
| 6,183,366 B1 | * | 2/2001 | Goldberg et al. | 463/42 |
| 6,202,062 B1 | * | 3/2001 | Cameron et al. | 707/3 |
| 6,212,511 B1 | * | 4/2001 | Fisher et al. | 707/1 |
| 6,298,383 B1 | * | 10/2001 | Gutman et al. | 709/229 |
| 6,324,587 B1 | * | 11/2001 | Trenbeath et al. | 709/310 |
| 6,339,774 B1 | * | 1/2002 | Nakayama et al. | 707/10 |
| 6,349,238 B1 | * | 2/2002 | Gabbita et al. | 700/101 |
| 6,374,290 B1 | * | 4/2002 | Scharber et al. | 709/205 |
| 6,430,545 B1 | * | 8/2002 | Honarvar et al. | 706/47 |
| 6,438,594 B1 | * | 8/2002 | Bowman-Amuah | 709/225 |
| 6,442,565 B1 | * | 8/2002 | Tyra et al. | 707/102 |
| 6,442,598 B1 | * | 8/2002 | Wright et al. | 709/217 |
| 6,460,036 B1 | * | 10/2002 | Herz | 707/10 |
| 6,467,052 B1 | * | 10/2002 | Kaler et al. | 714/39 |

OTHER PUBLICATIONS

Klyne, G. " A Syntax for Describing Media Feature Sets" Network Working Group, RFC 2533, Mar. 1999.*

* cited by examiner

Primary Examiner—Rupal Dharia
Assistant Examiner—Melvin H Pollack

(57) ABSTRACT

An approach for providing notification services using rules-based technology is disclosed. A Business Rules Manager module maps the business rules to business triggers, in which any pre-defined action can be performed based on the rule execution. Business rule triggers map a set of object life cycle states or business processes to set(s) of business rules; these business rules are mapped to trigger conditions. Notifications are then mapped to the business triggers (i.e., notification trigger points) such that the appropriate information can be sent to the recipients according to the business conditions or business rule actions. The users subscribe to the notification trigger points based upon the users' role, as specified in the user profiles. A user supplied subscription filter criteria permits filtering of the notifications. However, a global user override attribute associated with a notification trigger point can bypass the subscription filter criteria.

23 Claims, 15 Drawing Sheets

SYSTEM AND METHOD FOR NOTIFICATION SUBSCRIPTION FILTERING BASED ON USER ROLE

BACKGROUND OF THE INVENTION

1. Field of the Invention

The present invention relates to data processing, and is more particularly related to notification services.

2. Discussion of the Background

Rules based processing systems date back to the introduction of LISP (List Processing) to computer technology. LISP was primarily used in the AI (Artificial Intelligence) community to manipulate lists of data. Since that time the rules processing development tools were mostly targeted for simulations and AI type systems. It has only been recently that rules based systems have found newer markets because of easier code maintenance and high data processing performance.

With the advent and subsequent pervasiveness of the Internet, newer web-based technologies have become more dominant in their use and construction. The flexibility of these architectures has been to separate the clients and servers into tiers or levels of abstraction. Also, with the introduction of expert systems, business rule technologies have become more widely used.

Software business rules are the policies and procedures of a business captured in executable format. Business logic is the logic involved in implementing the policies and procedures of the business. In this context, business logic includes the assertions, assumptions and operations that define the policies and procedures of the business. Any software code that is not concerned with manipulation of the computing environment (e.g., retrieving data from storage, memory allocation, service invocations, etc.) is potentially a business rule. Business rules range in scope from simple validations to complex, multi-step procedures. Rules are always aligned with some aspect of business processes (e.g., invoicing, sales, manufacturing), commonly called domains. At the same time, rules are often invoked across business boundaries, for example, a sales application may invoke employee (e.g., human resource) rules to calculate a commission.

The separation of business logic from the internal source code has been a design pattern that has been promoted because of the flexibility it affords with respect to code reuse and modularity. A contemporary enterprise is defined by and encapsulated in its information systems. In effect, company policy manuals are now implemented in business software. The impetus for publishing policies and procedures of a business has been to enforce a consistent implementation across the enterprise. Computerization has not changed this requirement. However, implementation of such a system has been costly.

A rule, in general, is a statement that can be used to verify premises and enable a conclusion to be drawn. A rule-based system is an approach to problem solving based on an "IF this, THEN that" approach that uses a set of rules, a database (DB) of information, and a "rule interpreter" to match premises with facts and form a conclusion.

There are several considerations associated with implementing business rules for an enterprise. For example, the human reasoning behind a rule, or the "essence" of the rule, is often changed in transitioning from human-oriented user requirements to actual software code. In addition, the same logical rules may be implemented in several different software applications in an inconsistent manner. When rules are implemented as software code, the identification of specific business rules within a software application, or across several software applications, is often difficult or impossible. Also, modifying business rules embedded in traditional software applications in response to changing business conditions is difficult, time-consuming, costly and risky. Various designs and architecture schemes have evolved to address the need to abstract business-level actions from internal code workings of the software components. Object programming languages, client/server and n-Tier architectures, as an example, have become more prevalent as the software industry has evolved.

The use of notifications is an integral part of business operation; consequently, the business system must support the proper and timely issuance of notifications. For example, in a network operation center, it is imperative that appropriate personnel are notified when a critical network alarm occurs as a result of a cable cut or an equipment failure. The term notification is defined as a message that provides instructions, approval request or other business related information. This can either be in form of e-mail, page, or fax. At a high-level, the process of sending a notification is rather simplistic.

Traditional data processing systems have used the concept of computer generated notifications that are based on an object state or information state. Notifications in most legacy systems are generated either by calling specific methods or procedures that contain code associated directly with the desired notification. For example, if a notification that acknowledge that a user's request to purchase an item through an online shopping system (e.g., Sale Invoice) were required, traditional applications would call a specific method like generateNotification(ticket number, user Info, notification Type) or generateInvoiceNotification(ticket number, user Info) on a server or ticket object. The implementation details, such as the type of notification and contents of the notification, are tied directly to the method or procedure. When a new notification is needed, for example, a Thank You notification, the code in generateNotification( ) would have to be changed or a new method generateThankYouNotification( ) would have to be created.

A drawback with the traditional approach is that the implementation of the domain space is tied directly to the information contained within the object or the information passed through a procedure or method call. As the business conditions change, the implementation of the computer code must be modified to provide new responses and actions by the systems. Also, as the information changes or if new objects are added into the domain space, again the implementation of source code within a computer system must change. Hence, traditional systems lack modularity with respect to notification services.

Based on the foregoing, there is a clear need for improved approaches for implementing business rules to effect notifications.

There is also a need to increase architectural and design flexibility to adapt to changing business policies and conditions.

There is a further need to increase development modularity.

There is also a need to reduce development cost.

Based on the need to streamline the implementation of business rules, an approach for generating notifications that are independent of the system processes is highly desirable.

SUMMARY OF THE INVENTION

According to one aspect of the invention, a computer implemented method is provided for providing notifications in a distributed object-oriented environment. The method includes mapping one of the notifications to a notification trigger point. The notification trigger point is based upon a business rule that corresponds to an object life cycle state of an object. The method also includes receiving a notification subscription request from a user to subscribe to one of the notification trigger points, in which the user has a user profile that indicates the role of the user. The method further encompasses permitting the user to subscribe to the one notification trigger point based upon the role of the user. In addition, the method includes filtering the notification based upon subscription filter criteria and selectively sending one of the notifications to the subscribed user based upon the filtering step. Under this approach, design flexibility is enhanced, permitting adaptation to business policies and conditions without code change.

According to another aspect of the invention, a computer implemented system for providing notifications in a distributed object-oriented environment comprises a server that is configured to transmit a notification subscription request initiated by a user. A business rule manager module maps a business rule to a notification trigger point; the business rule corresponds to a business process at an object life cycle state of an object. A user manager module receives a notification subscription request from the user to subscribe to one of the notification trigger points. The user has a user profile that indicates the role of the user. The user is permitted to subscribe to the one notification trigger point based upon the role. A notification manager module is configured to filter the notifications based upon subscription filter criteria and to send selectively one of the notifications. The above arrangement advantageously provides development modularity.

In yet another aspect of the invention, a computer-readable medium carrying one or more sequences of one or more instructions for providing notifications in a distributed object-oriented environment. The one or more sequences of one or more instructions include instructions which, when executed by one or more processors, cause the one or more processors to perform the step of mapping one of the notifications to a notification trigger point, wherein the notification trigger point is based upon a business rule that corresponds to an object life cycle state of an object. Another step includes receiving a notification subscription request from a user to subscribe to one of the notification trigger points; the user has a user profile that indicates the role of the user. Another step includes permitting the user to subscribe to the one notification trigger point based upon the role of the user. In addition, a step includes filtering the notification based upon subscription filter criteria. Yet another step includes selectively sending one of the notifications to the subscribed user based upon the filtering step. This approach advantageously reduces system development cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
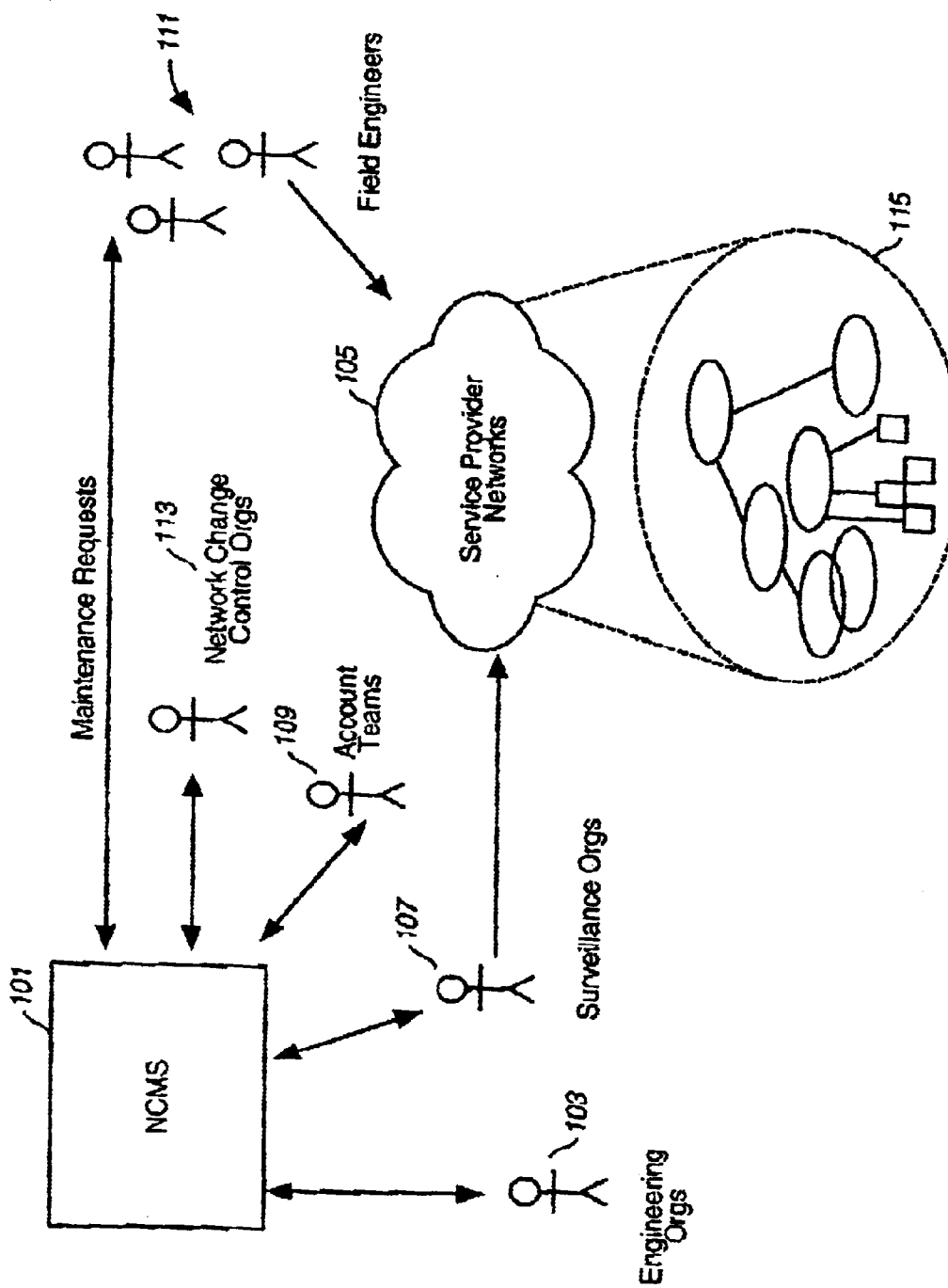
FIG. 1 is a block diagram of the Network Change Management System (NCMS), in accordance with an embodiment of the present invention.

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes the mapping of rules to business triggers, in which any pre-defined action can be performed based on the rule execution. Business rule triggers map a set of object life cycle states or business processes to set(s) of business rules that map to trigger conditions. Notifications are then mapped to the business triggers such that the appropriate information can be sent to the recipients according to the business conditions or business rule actions. Further, users subscribe to notification trigger points based upon the user profiles; in particular, the subscription depends on the role of the users. The users can create subscription filter criteria, which are modifiable by the users, to filter the notifications prior to reaching the notification targets.

Although the present invention is discussed with respect to a design and source code that use a combination of object languages, client/server distributed technologies, and business rule technologies, the design patterns can apply to any computer system regardless of selective architecture, language, or platform.

Network service providers are concerned with availability and reliability of their networks. These parameters are intertwined with the capability of the service provider to respond to maintenance requests from the customers that have traffic on the networks of the service provider. To coordinate these requests, the service provider needs to rely on a robust change management system to ensure that such requests are honored in a timely manner without scheduling conflicts. Change management is a set of complex business processes. The complexity stems from the fact that these business processes as well as the architectures of the service provider networks continually change, such that adaptation to these changes is onerous. Change control systems, or change management systems, operate within a telecommunication environment supporting network operation business processes, which are in constant flux, whereby new networks, customers, circuits, and approval processes are added and changed regularly.

System Overview

The function of the Network Change Management System (NCMS) involves the efficient handling of core operational areas of scheduling, conflict resolution, notification, and reporting associated with the maintenance of the network of the service provider. The expedient treatment of these core operational areas by the NCMS permits a Network Change Control Organization (NCCO), which is the personnel side of NCMS, to focus on identifying and managing the risk inherent during the maintenance of the networks.

The NCMS is a business critical system that supports a network service provider by supplying automated capabilities to optimize scheduling of circuit rearrangements and maintenance events, while validating and reporting customer impacts. Thus, the NCMS is an automatic schedule timeslotting and reporting system, utilizing object-oriented technology and middleware technology. The middleware technology, which distributed and offers network transparency, is specified by the Common Object Request Broker Architecture (CORBA), which is the standard distributed object architecture developed by the Object Management Group (OMG) consortium.

Furthermore, the NCMS, according to one embodiment, utilizes the JAVA language specification. JAVA applications coupled with CORBA compliant middleware enables object to object communication between the objects in client and server roles. In a CORBA environment, an Object Request Broker (ORM) receives request for services of software modules from programs on clients and servers. The JAVA/CORBA ORB middleware enables distribution of objects, making the NCMS appear as a single system. This architecture advantageously allows flexibility, scalability and adaptability to changing business conditions.

The NCMS encompasses JAVA-based client/server applications that are integrated with a business rule server. The business rule server applies system responses and actions to information that are contained within objects that are passed by reference. JAVA provides operating system independence, enabling language flexibility and code-reuse. JAVA applications and applets used with a JAVA Virtual Machine (JVM) can run on any OS platform that supports the JVM. The framework that allows the abstraction and control of system responses to the trigger conditions can allow or map any business condition or process state to that of a system action.

To appreciate the present invention, it is instructive to discuss briefly the Common Object Request Broker Architecture (CORBA) specification as well as object-oriented technology in general. CORBA is a specification that enables software modules to communicate with other software modules in other programs, even if the two programs are written in different programming languages and are running on different platforms. A software component is an individual modular software routine that has been compiled and dynamically linked, and is ready for use with other software components and programs. A software component has an intended purpose, which is to perform a specified function or functions. A software application is a collection of software components and an application facilitates the interaction between software components using the underlying communications infrastructure.

A software module is a collection of software components and data structures that perform a particular task or implements a particular abstract data type. A software object, in object-oriented programming, is a variable that has both software routines and data. The variable is treated as a discrete entity.

A program is a sequence of instructions that can be executed by a computer. A program may include a collection of software modules and/or a collection of software components. A software application is a program designed to assist in the performance of a specific task, for example, word processing, accounting, inventory management, software module management, and network management of software applications. A data element is a single unit of data, for example, a single bit value representing a value of true or false or a numeric value of 0 or 1, a sequence of bits representing a name, a sequence of bits representing a numeric value, or a single unit of data including a combination of data elements.

Systems information is data relating to the status of a software and/or hardware computer system, for example, data relating to whether a particular hardware or software component is functional or non-functional, and data relating to static or dynamic interfacing of various hardware and/or software components in a computer system or network. Functional means that the software component is performing its intended function, and non-functional means that the software component is not performing its intended function. In this context, a static interface means an interface between software components that is predetermined on the computer system. Additionally, predetermined means determined at the time of compilation of the code involving the software component. Further, dynamic interface means an interface between software components that is not determined at the time of compilation.

In a CORBA environment, a program makes a request for services of software modules through an ORB, and thus, does not need to know the design and composition of the program, which includes the software. In client/server applications, an ORB is an interface to which the client makes a request for service from a software object. The ORB then directs the request to the server hosting the software object and returns the resulting value(s) of the service to the client.

In an object-oriented programming environment, a client is defined as a member of a class or group that uses the services of another class or group to which the client is not related by way of inheritance from a common class or group. More generally, a client is a software module that requests a service provided by another software module. The client uses the requested service without having to know any working details about the other software module or the service. In a network environment, a server is defined as a computer or program that responds to commands from a client.

In a large enterprise such as a corporation, enterprise computing is the use of computers in a network or series of interconnected networks that generally encompass a variety of different platforms, operating systems, protocols, and network architectures. Middleware is software that is transparent to a user, which takes two or more applications and makes them work seamlessly together. With middleware technology, a user can design an ordinary component to provide its regular function, and then insert an appropriate middleware mix when the component is built or created at run time. For instance, CORBA is a middleware project.

A CORBA object bus defines the design of the resident components and how these components communicate with one another. CORBA was designed to allow intelligent components to discover each other and interoperate on an object bus. However, CORBA goes beyond interoperability. CORBA also specifies an extensive set of bus-related services for creating and deleting software objects, accessing them by name, storing them in persistent stores, externalizing their states, and defining ad hoc relationships between them.

CORBA software objects are components of intelligence that may reside anywhere on a network. They are packaged as binary components which remote clients may access via method invocations. Both the language and compiler used to create server software objects are transparent to clients. Clients have no need to know where the distributed software object resides or on what operating system it executes. The distributed software object may be in the same process or on a machine that sits across a large network. Additionally, clients have no need to know how a server software object is implemented. For example, a server software object may be implemented, for example, as a set of JAVA classes, or it may be implemented as a large COBOL (Common Business-Oriented Language) program. The client only needs to know the interface its server software object publishes. The interface then serves as a binding contract between clients and servers.

Such interface specifications are written in a neutral Interface Definition Language (IDL) that defines a component's boundaries; that is, its contractual interfaces with potential clients. Components written to IDL are accessible across languages, tools, operating systems, and networks.

IDL-specified methods can be written in and invoked from any language that provides CORBA bindings. Examples of such languages include JAVA, C, C++, Ada and Smalltalk. Programmers interact with CORBA software objects using native language constructs. IDL provides operating system and programming language independent interfaces to all the services and components that reside on a CORBA bus. This allows client and server software objects written in different languages to communicate with one another. OMG IDL is utilized to specify a component's attributes, the parent classes from which the component inherits, the exceptions it raises, the typed events it emits, and the methods its interface supports, including the input and output parameters and their data types. The CORBA IDL allows component providers to specify in a standard definition language the interface infrastructure of the software objects that they provide.

The CORBA Object Request Broker is the software object bus. As previously indicated, the ORB enables software objects to transparently make requests to, and receive responses from, other software objects located locally or remotely. The client is not aware of the mechanisms used to communicate with, activate, or store these server software objects. A CORBA ORB provides a wide variety of distributed middleware services. The ORB allows software objects to discover each other at run time and invoke each other's services. An ORB is much more sophisticated than alternative forms of client-server middleware, including traditional Remote Procedure Calls (RPCs), Message-Oriented Middleware, database stored procedures, and peer-to-peer services.

With an RPC, a specific function is called, and data is separate. In contrast, with an ORB, a call is made to a method within a specific software object. Different software object classes may respond to the same method invocation differently, through polymorphism. Since each software object manages its own private instance data, the method is implemented on the specific instance data. Thus, a call reaches a specific software object that controls specific data, and then implements the function in its own class-specific way. In contrast, RPC calls have no specificity—all functions with the same name are implemented the same way. A server cannot tell the difference between a static or dynamic invocation; they both have the same message semantics. In both cases, the ORB locates a server software object adaptor, transmits the parameters, and transfers control to the software.

The NCMS takes advantage of the flexibility and modularity of CORBA, coupling it with business rule technology. The NCMS is a unique type of client/server technology that supports management of maintenance events. Maintenance events, in an exemplary embodiment, are requested primarily by field engineers to perform maintenance on the circuits and equipment within the service providers' networks. Further, business rule engine technology permits modified on-the-fly and/or without any source code changes.

FIG. 1 is a block diagram of the Network Change Management System, in accordance with an embodiment of the present invention. In particular, the FIG. 1 illustrates the interaction between the NCMS 101 and the numerous actors 103, 107, 109, 111, and 113 within the organization of the service provider. These actors 103, 107,109, 111 and 113 may be humans or software agents. The NCMS 101 receives information from across the entire organization. The engineering organizations 103 supply scheduling and planning information regarding the network elements (e.g., switches, digital cross-connects (DXC), and etc.) 115 of the service provider network 105 to the NCMS 101. Through these actors 103, 107, 109, 111 and 113, the NCMS 101 is made aware of all design changes or plans with respect to the networks 105 in order to schedule the implementation of the design, as to minimize the disruption to the customers with traffic riding on network circuits. The network surveillance organizations 107 monitor alarms emanating from the networks (e.g., data networks, circuit switches networks, etc.) 105 and provide this information to the NCMS 101 in the form of completion status to the scheduled maintenance requests. To ensure that the customers are not gravely affected by any operational activities of the NCMS 101, the NCMS 101 notifies the account teams 109. Furthermore, the field engineers 111, who are responsible for installation and repair of the networks 105, submit maintenance requests to NCMS 101 as part of their job function. In response, the Network Change Control Organization (NCCO) 113 provides approval information regarding the operational activities to NCMS 101 as well as set policies concerning all aspects of network maintenance and operation.

The NCCO 113 provides the following services: scheduling, customized notification, customized reporting, conflict resolution, research and trending, and information services (i.e., providing plan maintenance data to other systems). The NCCO 113 initiates the scheduling of events (e.g. upgrading of a circuit) using the NCMS 101, which outputs a list of scheduled and nonscheduled events, for example. If the schedule is modified or updated for any reason, the NCMS 101 automatically updates in real-time and provides the revised schedule, which can be accessed by a user, for example, via a web interface.

The scheduling process applies scheduling and business rules to transform a request from the field engineers 111 into a scheduled maintenance event. Upon failure of a business rule, the scheduling process forwards the event to the conflict resolution process. The conflict resolution process is entered from the scheduling process when certain events exhibit common elements, such as identical date and time for the event.

Figure 2:
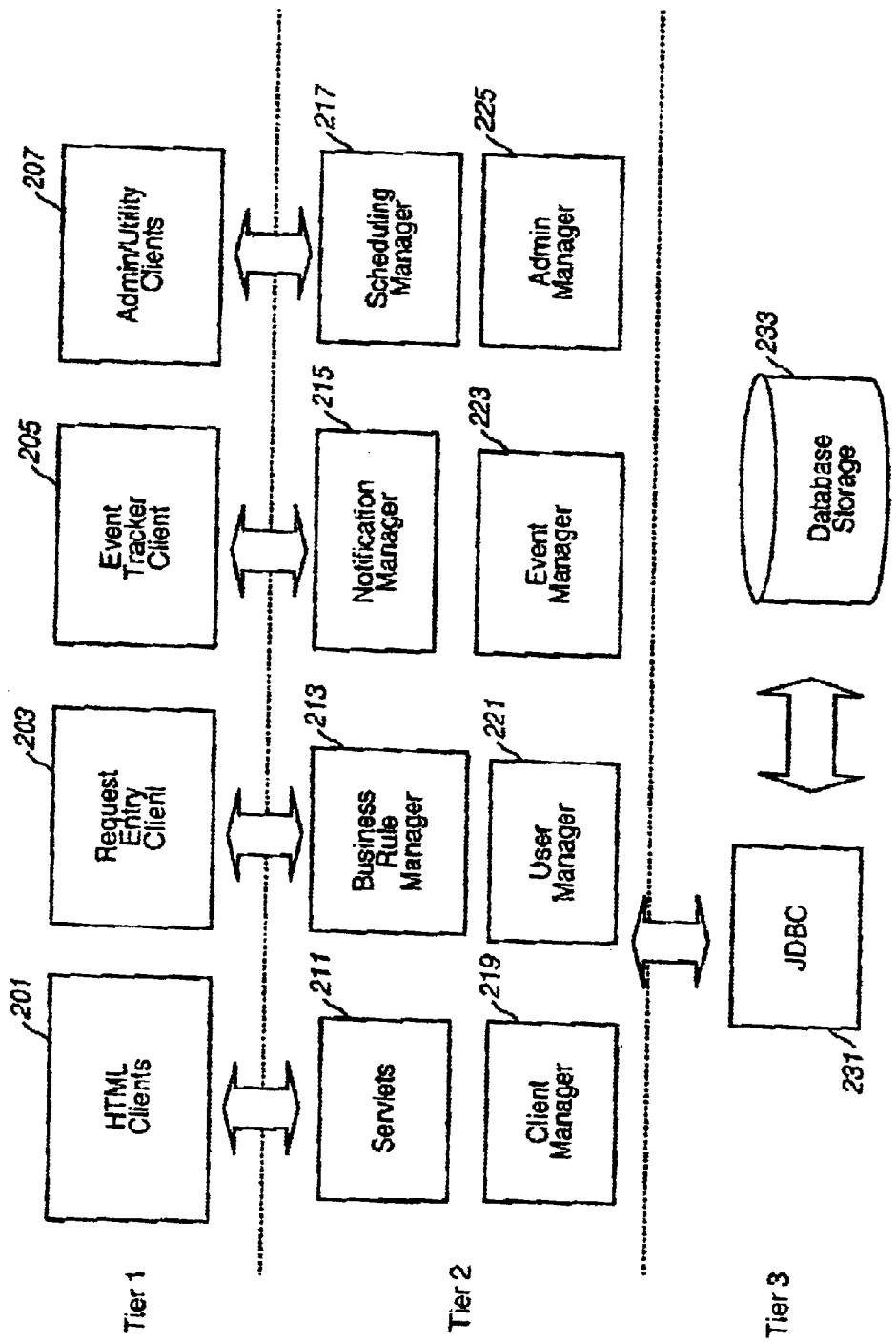
FIG. 2 is diagram of the NCMS 101 functional architecture of the system of FIG. 1.

FIG. 2 is diagram of the NCMS functional architecture. The NCMS 101 has a multi-tier distributed architecture: presentation logic, business logic and data storage, corresponding to Tiers I–III. Tier I is the primary interfaces for user interactions; these interfaces are supplied by various clients: HTML clients 201, Request Entry client 203, Event Tracker client 205, and Administrative/Utility client 207. The clients 203, 205, and 207 are JAVA applications, which can be downloaded to the users' computers (not shown). These clients 201, 203, 205, and 207 interface directly with business application servers (i.e., Tier II) that are distributed across the service provider network 105. The HTML clients 201 allow users to create and update their user profiles, which define their customized features and security access to the NCMS 101. The interfaces of the Request Entry client 203 permit users to enter maintenance request information interactively, providing real-time feedback and validation to the users. The Request Entry client 203 also processes updates to requests that have been entered. Client 203 contains several sub-processes to handle validations of request information, including business rule validation, field level input validation, and scheduling confirmation. The Event Tracking client 205 enables users to approve, deny, cancel events and provide real-time state changes to filtered views. The Admin/Utility clients 207 allow specialized interaction with common administrative data, management of users, notification controls, and business rule testing. These client applications 201, 203, 205 and 207 depend on the Tier II business services.

These Tier II business services reside on a multitude of servers, which encapsulate the business logic and business rules that are used throughout the NtMS 101. Essentially, these servers provide shared services that the client uses for its application logic. Within Tier II are the following business services: servlets 211, a Business Rule Manager 213, Notification Manager 215, Scheduling Manager 217, Client Manager 219, User Manager 221, Event Manager 223, and Administration Manager 225.

The Notification Manager 215 provides external communication services, including e-mail, paging, and faxing. The Scheduling Manager 217 provides planning and optimization services for receiving requests from the user into the most optimal scheduled time slot. The Scheduling Manager 217 also provide services such as the best available time slots, planning constraints based on business rules, and schedule management.

The User Manager 221 is responsible for controlling the User, Role and UserProfile objects, which represent the user's preferences. From the perspective of a design pattern, the User Manager 221 is a server object that functions both as a Factory object and a Manager object. The functionality of the User Manager 221 includes instantiation and registration of User, Role and UserProfile objects, management of these objects during their lifetimes, and graceful deactivation of these objects. Basic user information (e.g., identity and contact information) is captured in a User object. Each UserProfile inherits this basic information from a User object and carries login and customized information. Furthermore, each UserProfile is assigned a Role, which is used to control security accesses and permissions. The User Manager 221 provides handling of user login/logout to the NCMS 101. In addition, the User Manager 221 performs creation, management, and removal of roles and user profiles. The User Manager 221 also retrieves information that is captured in each user profile. The User Manager 221 locks and unlocks the user profiles (i.e., inactivate/reactivate user accounts).

The Event Manager 223 is a Factory server and contains the processes for monitoring and processing events. The Event Manager 223 interacts with the client interface to provide real-time updates on the events. Event services, as provided by Event Manager 223, offer push-technology to the client interfaces to allow an efficient model of real-time data transfer. The Event Manager 223 employs listener/subscriber components that interact between the client and servers to provide updates of event information to the client interface. Further, Event Manager 223 is a CORBA persistent object. Clients bind to the Event Manager 223, which creates new events, retrieves object references to existing events, forces event conflicts, and updates an the approval status on an event. Additionally, the Event Manager 223 obtains customer impact information and event list data. The Administration Manager 225 service handles all management of threshold values, user security, user profiles, message templates, and etc. These servers 211, 213, 215, 217, 219, 221, 223, and 225 within Tier II interact with data storage devices and other external interfaces of Tier III.

Tier III contains the primary data storage for the NCMS 101 and includes a JDBC (JAVA Data Base Connectivity) driver 231 that enables the Tier II servers to link to database 233. The database 233, according to an exemplary embodiment, is a RDBMS (relational database management system).

Figure 3:
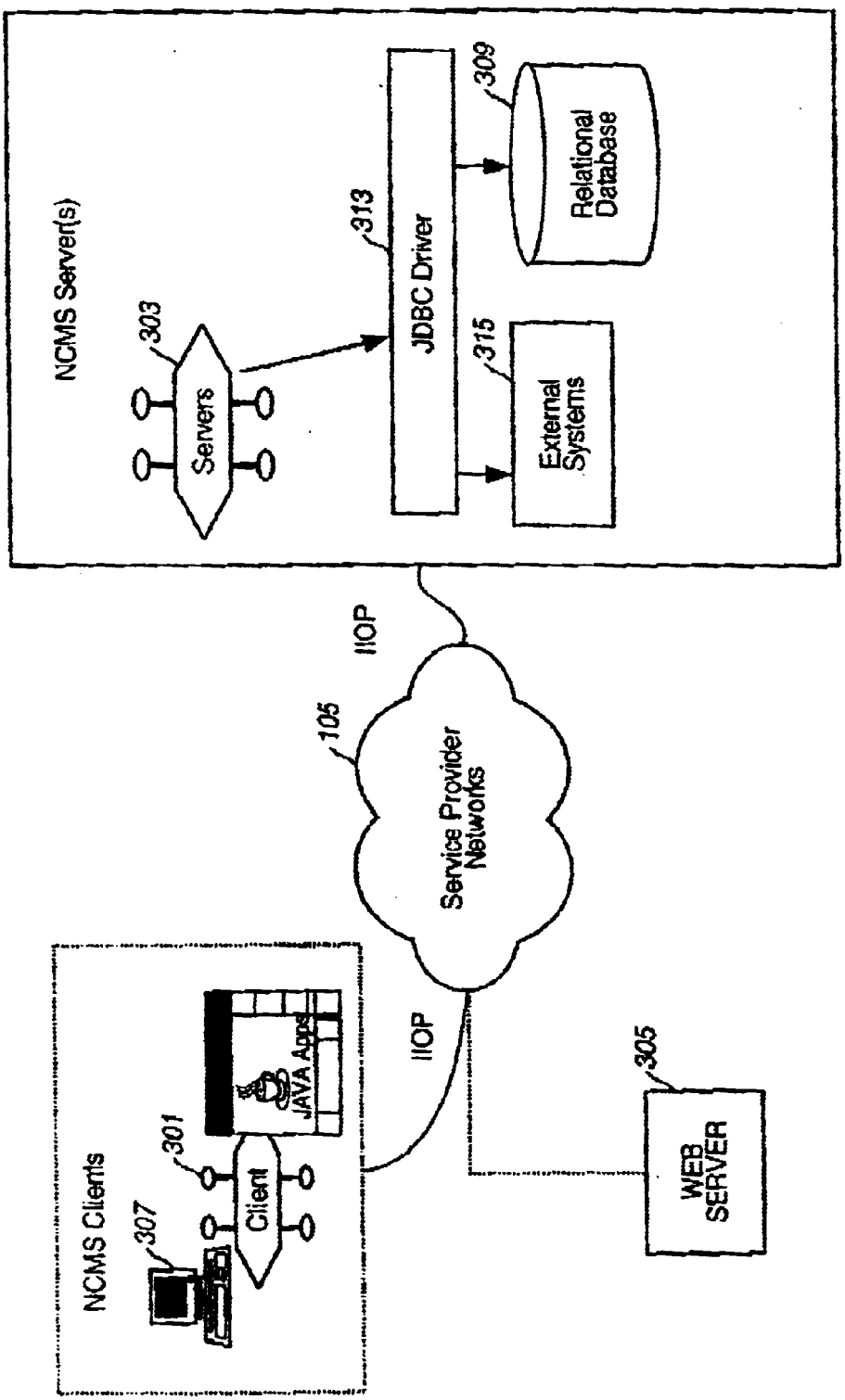
FIG. 3 is a diagram of a Common Object Request Broker Architecture (CORBA), in accordance with an embodiment of the present invention.

FIG. 3 is a diagram of a Common Object Request Broker Architecture (CORBA)-based software architecture of the NCMS 101, in accordance with an embodiment of the present invention. The software architecture is shown as a set of CORBA services and middleware processes that are instantiated to support request handling management, scheduling of circuit rearrangements and maintenance events, and validation and reporting of customer impacts. As previously discussed, CORBA provides a "network independence" architecture that allows distribution of JAVA-based applications to any networking platform. CORBA as a standard provides a rich set of system-level services; i.e., "object services," such as transaction processing and security. In an exemplary embodiment, the ORB is VisibrokerTm by Inprise Corporation.

Utilizing the Internet Inter-ORB Protocol (IIOP), NCMS clients 301 communicate with NCMS servers 303 via the service provider networks 105. For HTML clients, a web server 305 is attached to the service provider network 105. The web server 305 can be used in conjunction with the NCMS clients 301 to interact with the user and the client software. For example, this architecture permits ease of client software upgrades. In such a case, a user downloads a client software from the web server 305 and installs a JAVA application onto a user PC (personal computer) 307. Each time a client application is started, the client application checks if it has the latest copy of the software and/or JVM by issuing requests to the NCMS servers 303. In turn, the NCMS Client 301 prompts the user to determine whether the user desires to upgrade to a new version of the software.

The NCMS servers 303 interact with a relational database 309 to obtain data. To retrieve data from the relational database 309, the servers 303 communicate with a JDBC driver manager 313, which exchange messages with relational DB 309. The driver module 313 also communicates with various other external systems 315 (e.g., legacy systems).

Figure 4:
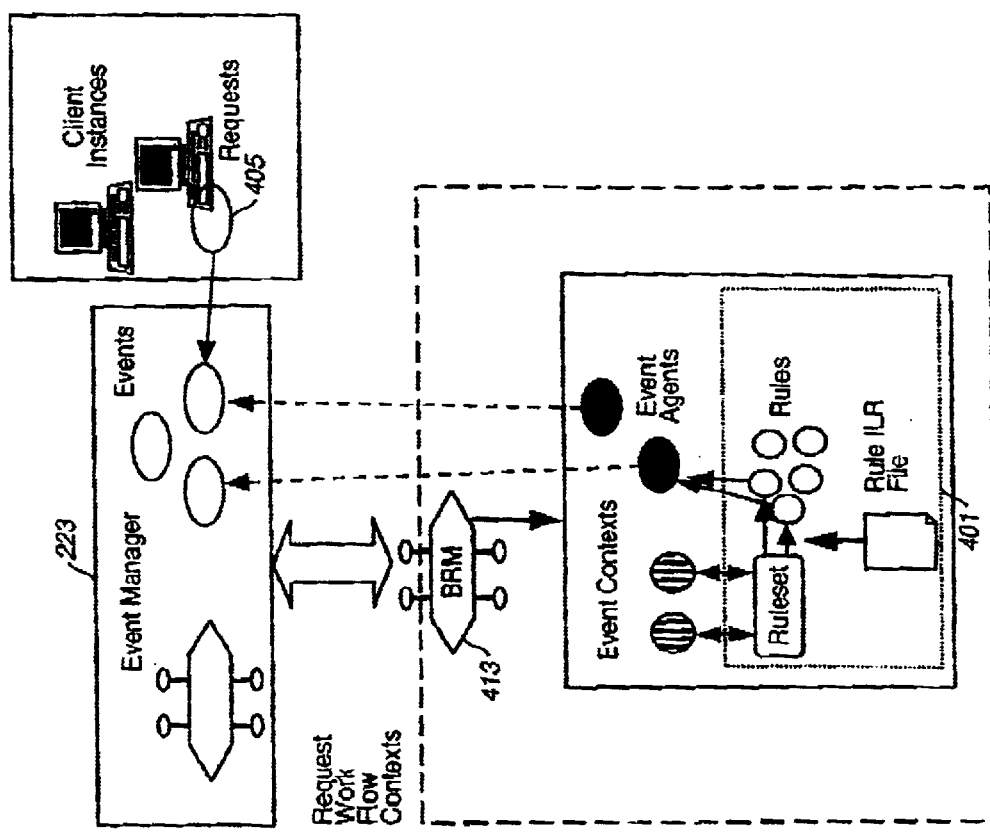
FIG. 4 is a diagram of the business rule manager (BRM) interacting with the event manager, according to the system of FIG. 1.

FIG. 4 is a diagram of the Business Rule Manager (BRM) interacting with the Event Manager. The BRM architecture is based on a centralized approach to managing rules. Agents are used in the rules engine to provide an easy to use application programming interface (API) for access to the business objects. BRM 413 is a stand-alone CORBA server that is responsible for the execution of all business rules. BRM 413 uses other NCMS 101 services to send notifications, update and check other CORBA objects.

Rules can be managed or modified directly by the NCCO 113 without shutting down the NCMS 101. Additionally, rules can be applied to any NCMS object. The BRM 413 encapsulates the Event Contexts and Rule sets 401, which process business rules that act on Events contained within the memory space of Event Manager 223. A Request Work Flow 405 client process is integrated with NCMS clients 401, which communicate through Event Manager 223 and then finally to the BRM 413 to process requested rules in real-time. A rule repository identified within 401 stores business rules, for example, as an ASCII (American Standard Code for Information Interchange) files.

Notification Services

For certain business processes, the NCCO 113 must send notifications to all interested parties. For example, when a field engineer submits a request for maintenance, the NCCO 113 must send a confirmation of the submittal to the field engineer as well as the contacts that the field engineers have specified on the request. However, in some cases (e.g., data network requests), a notification is not normally sent to the field engineer. The concept of a business trigger point and a subscription process with filters addresses both of these scenarios.

In order to selectively transmit notifications, logic is required to discern to whom a notification is to be sent and under what conditions. The present invention defines a business trigger point and associated business rules, which act on the trigger point. Business trigger points can be thought as a mapping of an object state, process state, or point in time in a process flow that requires an action of sending a notification (i.e., notification trigger point).

Notifications are sent by the Notification Manager to notification targets; a notification target is either a predefined user group or a distribution list. Those targets associated with a particular notification template, which in turn is associated to a particular notification trigger point, are notified when the notification trigger point is reached. In other words, notification templates identify generically the categories of entities to notify (i.e., notification targets). The template also defines the media type (e.g., email, fax, and page). Templates permit the use of dynamic and static text messages, which are based upon the business conditions. A notification template in the NCMS 101 is represented by a notification template object (i.e., NotificationTemplate).

The notification template is a transient object, which provides total configuration control for a particular notification template. Several notification template objects may be instantiated, but according to an exemplary embodiment, only one object per notification template may exist at any given time. Each notification template object has a collection of notification target objects.

Each of the notifications is specified by the target attribute of the notification target object. If the target type is e-mail distribution list, the target attribute should contain an e-mail address. Six target types exist; the types depend on the relationship with an event. These target types are either directly or indirectly associated with an Event, as shown in Table 1.

TABLE 1

| NOTIFICATION TARGET TYPES | ASSOCIATION TO EVENT |
| --- | --- |
| (1) Requester | Direct one-to-one relationship |
| (2) Approval Authority | Direct one-to-one relationship |
| (3) Work Performer (Site Contact) | Direct one-to-many relationship |
| (4) Distribution Contacts | Direct one-to-many relationship |
| (5) Distribution Lists | Direct one-to-many relationship |
| (6) Subscribers | Indirect |

A notification target is attached to the notification template. The first target type is the Requester, which has a direct one-to-one relationship to an Event. The Requester's user profile object reference is always attached to the Event. The next type is the Approval Authority, which also has a direct one-to-many relationship. An approval authority is an entity that grants permission for an action to take place. An Event can have more than one approval authority. In an exemplary embodiment, an Event will always have the NCCO 113 as an approval authority. The other approval authorities are determined from the Requester's user profile. During the processing of the event (which can be a request), the NCMS 101 determines whether the contact has a user profile. If the contact does have a user profile, the object reference to the user profile is used to attach the individual user to the Event. However, if the contact does not have a user profile, a general contact object is created. This contact object is re-used when the contact is associated to other events.

Another target type is the Work Performer (i.e., Site Contact), which has a direct one-to-many relationship to an Event. For each location (site or CLLI (Common Language Location Identifier) code), the Requester can enter multiple contacts that will be performing the work. The next target type is the Distribution Contacts, which has a direct one-to-many relationship to an Event. During the processing of the Event, the Requester can enter multiple contacts that they designate to receive the notifications about an Event.

Yet another target type is the Distribution Lists, which are e-mail addresses that point to a mailing list. An administration client interface provides a way for the NCCO 113 to manually associate lists directly to the notification templates, which identify generically the categories of entities to notify (i.e., notification targets).

The next target type is termed Subscribers. Subscribers are no longer associated directly to a notification template as a target. Subscribers are dynamically assigned when a user "subscribes" to a notification trigger point. The subscription process is performed during the setup of the UserProfile object. Subscribers can supply filter criteria to provide additional flexibility in receiving their notification.

The NCCO 113 can e-mail general contacts in the system to notify them to create a user profile. This feature is advantageous in that the system can customize the notifications they receive. The system can have a web interface to assist setup of user profiles; with the ubiquity of the World Wide Web, such an interface is readily accessible.

Figure 5:
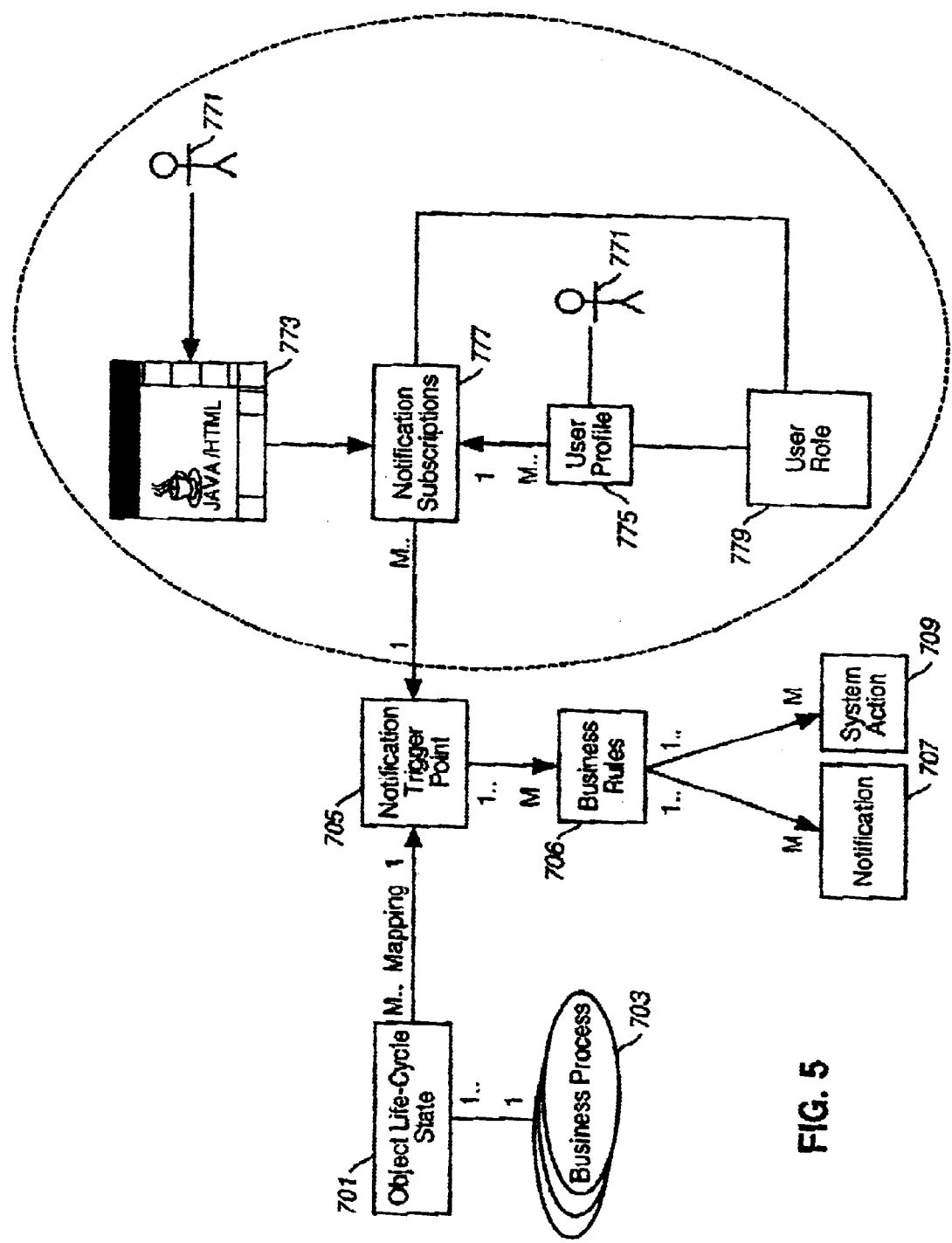
FIG. 5 is a block diagram of the mapping of business processes and object states to a business trigger point for the generation of notifications, in accordance with the system of FIG. 1.

FIG. 5 shows a diagram of the mapping of business processes and object states to a business trigger point, in accordance with an embodiment of the present invention. At each life-cycle state 701 of an Event object, certain core business processes 703 will be executed by rules. According to one embodiment of the present invention, a rule has three main parts: (1) parameters, (2) conditions, and (3) actions. Rule conditions represent the filters to be used on the objects processed in memory. The rule actions define what "actions" or instructions the system should take in response the given condition. The performance gains are made because the conditions are matched against all objects in memory. This is in contrast with traditional applications that have to query a data store requiring sequential tests on the objects.

As shown in FIG. 5, the business processes 703 are mapped to object life-cycle states 701 of corresponding Event objects; these object life-cycle states 701 are then mapped to a business trigger point 705. Business trigger points are a subset of the Event Rule Categories that require an action of sending a notification (i.e., notification trigger points). Therefore, the term business trigger point is used herein synonymously with notification trigger points. The action of sending the notification can be controlled by the business rules 706 that read in by the BRM server (not shown). The trigger points have been grouped into three categories based on the type of information the notification is created from: (1) events, (2) schedules, and (3) window affecting notifications.

Using a defined set of business trigger points, the NCMS 101 utilizes the trigger points in two ways. The first mechanism is to define notification templates that are assigned to the triggers. The second way provides the ability for the users to subscribe to the trigger points (i.e., subscription mechanism). The notification templates allow the abstraction of the notification specifics, such as the notification message, the notification media types, and the targets of the notification. The subscription mechanism allows users of the system to define what notifications they want delivered to them. The concepts of notification templates and notification subscription are more fully discussed below.

Based upon business trigger point 705, which corresponds to one or more business rules 706, a notification 707 can be sent out or a system action 709 can be performed. For example, when an Event is submitted, the NCMS 101 can make a determination of what notification trigger to use in the sending of notifications. As a maintenance request is being entered, the BRM (not shown) reacts to the information being entered by the Requester. The BRM, which is a stand-alone COBRA server, has responsibility for the execution of the business rules. Furthermore, Out-of-Guideline (OOG) messages can be sent directly to the Requester. An OOG message represents a rule violation condition on the Event. When the request is entered, NCCO 113 personnel can be alerted to special conditions and OOG conditions. Under this approach, training time can be reduced in that the policies of the NCCO 113 need not be learned; in addition, the probability of entering erroneous information into the NCMS 101 is minimized.

Notification categories are used to bundle the different types of notifications based on the notification trigger points. These categories include: (1) notifications and notification trigger points associated with only one Event in time; (2) notifications and notification trigger points that generate reports; and (3) notifications and notification trigger points that associate or drive the generation of Maintenance Event Windows alerts and notifications.

As indicated previously, a notification trigger point is defined as a business process point in time that requires the NCMS 101 to generate and send out a notification. The actual decision of sending the notification can be controlled by the rules of the BRM server. The processes for sending and receiving notifications, according to an embodiment of the present invention, is described below. The breadth of the processes ranges from notification creation by an administrator of the NCMS 101 to sending a specific notification type (i.e. e-mail) to a specific mail address. Notification processing is a complex series of processes across all domains, including: administration, business rule services, event management services, notification management services, and manager approval services. Other external systems can also be included as appropriate for sending the notifications to the receipts based of media type of the notification. The notifications can be constructed and forwarded to the recipient in different media formats.

Returning to the example of the field engineer, the NCMS 101 requires the field engineer to register with the NCMS 101 before a request can be entered and processed. As a result, the NCCO 113 has the ability to collect certain information from the field engineer via the creation of a UserProfile. The UserProfile provides the user information within the NCMS 101. Within the UserProfile, a user can specify whether the user desires to subscribe to certain notification trigger points.

The subscription mechanism is similar to the concept of subscribing to a mailing list. The NCMS 101 permits the user to select the notifications and the special conditions or parameters surrounding the manner in which the notification is received. That is, the user subscribes to notification trigger points. A subscription item is defined as a notification trigger point that a user can subscribe to, depending on the role of the user, as indicated by the UserProfile. The subscription item is a subset of the notification trigger points, which are defined in the NCMS 101. Further, subscription filters can be employed by the NCMS 101, permitting the user greater control in the type of notifications that are received. This capability advantageously enables the user to more efficiently process notifications because irrelevant or less important notifications are filtered out.

A subscription filter is a user supplied criteria that instructs the system to check conditions before the target user is sent a notification. In an exemplary embodiment, the filters that the user can modify includes: networks, locations (Site or CLLI codes), customers/circuits, and notification templates. When a trigger condition is fired, a user who has subscribed to a trigger point that has not been filtered out will receive a notification based on the notification templates associated with that trigger point. The user can set a subscription filter using a GUI as described in FIG. 8a, below.

The most dynamic object in the NCMS 101 is the Event object. The event object is the primary CORBA transient object created by the Event Manager object, which acts as an object factory for the Event object. The Event object has many objects that are linked to it in an aggregate (containment by value) relationship, such as EventCode object, AdditionalContact object, ApprovalAuthority object, and ConflictingEvent object.

A state is a condition during the life of an object when the object satisfies certain parameters, performs some action, or waits for an event. The state of an object may be characterized by the value of one or more of the attributes of the class. For example, upon detection of an OOG rule violation, the Event object set its OOG flag indicator. As listed in Table 2, the following states exist for an Event: Creation, Waiting Review, OOG/Conflict, Denied/Cancelled, Approved, In Maintenance, and Completed.

TABLE 2

| CURRENT STATE | TRANSITIONED TO STATE | ACTIONS |
|---|---|---|
| Creation | OOG/ Conflict | Requester forces an OOG override condition. BRM detects conflict. Equipment validation fails after the Event is entered. |
| | Waiting Review | Transient state to wait for an update. BRM determined it could be auto-approved and goes through this state quickly. |
| Waiting Review | Approved | BRM auto-approves the Event. Event Coordinator manually approves. Final approval received from approving authorities. NCCO overrides all approvals and approves. |
| | Denied/ Cancelled | Event Coordinator manually status changes. |
| | OOG/ Conflict | Event Coordinator forces conflict. BRM determines a OOG condition based on window timing and approval timing rules. BRM determined a conflict with another Event though an update or another new or updated Event. |
| OOG/ Conflict | Waiting Review | Transient state to wait for an update after OOG or Conflict status is applied. |
| | Completed | Event Tracker forces the Event to Complete |
| Denied/ Cancelled | | Final state of event that cannot be scheduled or performed. |
| Approved | Waiting Review | After the Event has been approved, before the maintenance window, either NCCO or the Requester can deny or cancel the Event. |
| | OOG/ Conflict | Event Coordinator forces conflict. BRM determines a OOG condition based on window timing and approval timing rules. BRM determined a conflict with another Event though an update or another new or updated Event. |
| | In Maintenance | Based on the Event's Maintenance Window, the Event can be put into a Maintenance Mode. |
| In Maintenance | OOG/ Conflict | The BRM can detect and OOG or conflict and force the Event into this state. |
| | Completed | The Event Tracker can close out the Event by updating its Completion information after the Events Maintenance or after the Actual Start Time of the Maintenance. |
| Completed | | Final stated for a Completed Event after Maintenance is performed. |

The Creation State (or Initialization State) is the beginning state of the Event. This state is achieved when the request work flow process is first started for a Event. During the processing of the event, the Event Manager is contacted and, in turn, communicates with the BRM to determine various validation check points statuses. Upon completion of the work flow process, the BRM asserts the Event into its working memory to check all remaining conflicts with other Events in the NCMS 101. The BRM is also contacted to send out a Submit notification. Additionally, the Event Services CORBA server is contacted to broadcast a message, to the appropriate channel, for the subscribing GUI clients to receive the message that a new Event has been created. From this state, the Event can be either in OOG/Conflict status or placed in a Waiting Review state.

The Waiting Review state represents a transition state for an entity to review the Event and to make a decision on its status. The Event stays in this state until either an Event Coordinator has reviewed it or the system automatically approves or updates the Event. This state will be automatically transitioned to Approved if the NCMS 101 determines that all the business rules have been completed. The Event rules are set up so the Event does not require a manual review. Alternatively, the Event remains in waiting review state until either an Event Coordinator or NCCO operator reviews and status changes it or forces the Event in conflict. The BRM can also engage the Event in conflict with another Event at any time or based on timing triggers (e.g., waiting for approvals); thereafter, the BRM can place the Event in an OOG/Conflict state.

The OOG/Conflict state represents a condition whereby the BRM detects a rule violation on the Event. These rule violations are categorized as either OOG or in Conflict. The OOG/Conflict state can transition to another state, at any time in the life-cycle of the Event, upon the BRM detecting a conflict or OOG condition on the Event.

Based on the type of OOG condition or conflict, the Event may initiate a message to the BRM to send out a notification. BRM determines the exact type of notification to be sent out, as necessary. The Event Manager server is instructed to broadcast a message to the GUI clients to notify these clients that a change has occurred in the status of the Event. In the case of a conflict, the BRM creates a conflict analysis object indicating the nature of the conflict with other Events. If a OOG condition is detected, the BRM creates OOG analysis objects to be associated to the Event.

The Event can transition out of the OOG/Conflict state in response to the following three conditions: (1) manually/automatically reviewed, (2) conflict solved, and (3) event completed. In the first condition, the Event transitions to the Waiting Review state and then to one of the Approval States (Approved, Denied, Cancelled) if an Event Coordinator manually updates the status. Additionally, the Event can be automatically reviewed if a Request for Approval is received by an Approval Authority. If a conflict is solved (i.e., second condition), the Event transitions out of the OOG/Conflict state. In particular, because the BRM is constantly receiving updates to conflict statuses either through direct updates to the Events or by resolving through the Update or Approval processes, conflicts are continually being solved. Another way to transition out of the OOG/Conflict state is to complete the event. While in the In Maintenance state, the Event could violate rules associated with the Maintenance Window. NCCO and Event Tracker/Coordinators have the ability to complete an Event that in effect closes the event for future updates and purges it from "working memory".

As mentioned above, the approval states include the Approved state, Denied state, and Cancelled state. The Denied/Cancelled state represents a final denied or cancelled status of the event. Both of these states are similar and represent a termination state for the Event. However, the Event performs different actions for Denied state than the Cancelled state. The approved state represents a final approval state for the Event. This state can either be reached by auto-approving based on the BRM or manually approved by the Event Coordinator. For each of the approval states, the BRM is contacted to send out a type of notification; the Event Manager server is also contacted to broadcast a message to the subscribing GUI clients.

The In Maintenance state represents an active maintenance state of the Event. When the Maintenance Window is reached or initiated, the BRM will activate rules checking on the Event until it is completed. The Event Manager server is contacted to broadcast a message to the subscribing GUI clients, indicating that the status of the Event has changed.

The Completed state is reached only when after an Event has started maintenance. As with the approval states, the BRM is contacted to send out a type of notification. Further, the Event Manager server broadcasts a message to the subscribing GUI clients to notify them of the change in event status.

Table 3 shows the relationship of an exemplary mapping of business processes and object states, along with the actions and/or notifications that are required to be generated. This table shows an example of the business processes and/or object life-cycle states, which represent the NCCO's business processes. For example, an approval action by the NCCO 113 on the maintenance request changes the request to an approved state. When a request is approved, several actions must be performed by the Change Management system. Depending on who approved the request, in this case, an NCCO engineer, the rule actions are set to the approval state on the Request object and to generate an approval e-mail to the requester of the maintenance. The notification designs are controlled by the Notification Template.

Each UserProfile object 775 maintains a collection of Contact objects, each of which in turn references a particular User object. These contacts, for example, can be the user's manager and/or director and are used for notification purposes. Each UserProfile object 775 may also contain a collection of subscriptions to business notification trigger points, which are points in the business process that notifications are sent whenever certain event occurs. Each Subscription object identifies a particular business notification point, and may contain a collection of subscription filters objects (CircuitFilter, CustomerFilter, LocationFilter, and NetworkFilter), which narrow the type and number of notifications to only those events that match specific criteria.

Additionally, the UserProfile object 775 may contain a collection of customized settings for the user's default networks, work locations, search preferences, and display

TABLE 3

| BUSINESS PROCESSES AND/OR OBJECT STATE | BUSINESS TRIGGER POINT | REQUESTED ACTION |
| --- | --- | --- |
| 1. Maintenance Change Request Approved by NCCO | NCCO Maintenance Approved | Send a notification to all parties associated to the Maintenance request and subscribers of the Trigger Point |
| 2. Maintenance Change Request Denied by NCCO | NCCO Maintenance Denied | Send a notification to all parties associated to the Maintenance request and subscribers of the Trigger Point |
| 3. Maintenance Change Request Canceled by NCCO | NCCO Maintenance Canceled | Send a notification to Requester and their contacts only. |
| 4. Maintenance Change Request Canceled by User | User Maintenance Canceled | Send a notification to Requester only. |

The business rules are setup so that if the rule condition is matched, (i.e., Approved state detected on the Request object) a notification is generated. The BRM server uses the business trigger point as the execution action by the fired rule.

As seen in FIG. 5, for the subscription process, a user 771 makes the selection of what notification and associated special conditions are required to receive the notification. The user 771 via a GUI on a Java/HTML client 773 communicates with the NCMS 101. The user 771 is essentially subscribing to notification trigger points. That is, the notification subscriptions 777 are mapped to the business trigger points 705. When a trigger condition is fired, anyone who has subscribed to the point that has not been filtered out will receive a notification based on the notification templates associated with the trigger point.

When a user 771 first registers with the NCMS 101, a user profile 775 is created for that user 771. One of the purposes of a user profile 775 is to capture information that is to be used for notification and identification during request entry and event tracking, as well as information that is to be used as a convenience feature for the user 771. The user profile 775 includes mandatory information such as name, role assignment, department, contacts, and optional information (e.g., notification subscriptions, network/location preferences, and search/display preferences). The UserProfile object 775 is derived from the User object, allowing it to inherit attributes such as name, e-mail, phone, and paging information. The UserProfile object 775 encapsulates all user information and customized settings for one login account.

preferences. The UserProfile operations, according to one embodiment, are listed in Table 4, below:

TABLE 4

| OPERATION | DESCRIPTION |
| --- | --- |
| getRole() | Returns the UserProfile's role assignment. |
| getContacts() | Returns the UserProfile's list of contacts. |
| GetSubscriptions() | Returns the UserProfile's list of notification subscriptions. |
| getNetworks() | Returns the UserProfile's list of network selections. |
| GetDisplaySettings() | Returns the UserProfile's list of display settings. |
| GetSearchSettings() | Returns the UserProfile's list of search engines. |
| addContact() | Adds a contact to the UserProfile's list of contacts. |
| add(Subscription) | Adds a subscription to the UserProfile's list of subscriptions. |
| add(Network) | Adds a network to the UserProfile's list of networks. |
| add(DisplaySetting) | Adds a display setting to the UserProfile's list of display settings. |
| add(SearchSetting) | Adds a search setting to the UserProfile's list of search settings. |
| update(Subscription) | Modifies the attribute(s) on an existing subscription owned by the UserProfile. |
| update(DisplaySetting) | Modifies the attribute(s) on an existing display setting owned by the UserProfile. |
| update(SearchSetting) | Modifies the attribute(s) on an existing search setting owned by the UserProfile. |
| remove(Contact) | Removes a contact from the UserProfile's list of contacts. |
| remove(Subscription) | Removes a subscription from the UserProfile's list of subscriptions. |

TABLE 4-continued

| OPERATION | DESCRIPTION |
| --- | --- |
| remove(Network) | Removes a network from the UserProfile's list of networks. |
| remove(DisplaySetting) | Removes a display setting from the UserProfile's list of display settings. |
| remove(SearchSetting) | Removes a search setting from the UserProfile's list of search settings. |
| MakePersistent() | Saves the current state of UserProfile object to the persistent datastore. |
| close() | Terminates the UserProfile object and deallocates all objects under its ownership. |

The NCMS 101 permits notifications to be mapped to the user role 779, such that a user 771 receives only those notifications that are assigned to a particular role. For example, if a user 771 is an engineer, the user 771 can only receive notifications that have been reserved to engineers (e.g., network alarms). The user roles 779 can be altered dynamically; for instance, the engineer's role can be elevated to a manager on a temporary basis. Accordingly, higher level notifications that were previously restricted from the user 771 as an engineer can now be received by the user 771 in the manager role.

Each Role represents a set of capabilities, control, and security permissions within the NCMS 101. Role assignment, according to one embodiment, can be determined by the department to which the user belongs. The level of access that is granted to each user 771 is based on the needs of the individual user 771. This need, for example, can be determined at the department level by maintaining a role-to-department mapping; the role-to-department mapping is controlled by the NCCO administrator. In an exemplary embodiment, a special administrator role and a "superuser" role are given to users in the surveillance organizations 107 (FIG. 1) and the NCCO departments. A superuser is a user with an expanded or higher role, relative to the normal user. These roles give full access to the capability and control that are offered by the administration services. All other users are assigned a default role. The Role object encapsulates security permissions assigned to each category of users 771. Some principal Role operations are shown below in Table 5:

TABLE 5

| OPERATION | DESCRIPTION |
| --- | --- |
| add() | Adds a new role to persistent storage. |
| Delete() | Permanently removes the role from memory and persistent storage. |
| MakePersistent() | Saves the current state of the Role object to the persistent datastore. |
| GetSecurityMap() | Returns a collection of SecuredObject-to-XCRUD value mapping. |
| AddSecuredObject() | Adds a SecuredObject to the securityMap. |
| close() | Terminates the Role object and release any allocated resources. |

A securable object in the GUI domain is any field, popup list, menu, etc. that requires security control. The concept involves restricting accesses to and the operations on sensitive data by implanting the security permissions (Execute, Create, Read, Update, and Delete) into the targeted (i.e., securable) GUI objects upfront. The approach is to develop every possible combination of the XCRUD (Execute-Create-Read-Update-Delete) permissions, to assign each with an unique numeric value, and then to associate each securable object in the GUI domain with an XCRUD value.

Thus, by tagging each securable object with an XCRUD value that specifies the set of permissions, the client application controls what the user can see or do when the application creates (or paints) each screen.

Each instance of the Role object is a transient CORBA object. When each Role object is no longer needed, the User Manager server object (UserManager) saves the state of the Role object to the persistent datastore.

An assignRole(UserID,role) operation is invoked to assign a role to a target UserProfile identified by the UserID (i.e., user identification). A Requestor with administrator role retrieves a list of users whose user profile needs special role assignment. The Requestor selects each user, determines the user's appropriate role assignment, and invokes the assignRole(UserID, role) operation on the UserManager object.

In turn, the UserManager retrieves the UserProfile that matches the target UserID and the Role parameters. The UserManager then validates the department of the UserProfile against the departments associated with the Role (using a role-to-department mapping) to ensure that the role assignment is appropriate. If the validation is correct, the UserManager assigns the UserProfile with the new role; otherwise, the UserManager will assign the UserProfile the new role, but will return a warning to the Requestor that this role assignment may not be appropriate. In the latter case, the Requestor has the responsibility to make the final adjustments.

Figure 6:
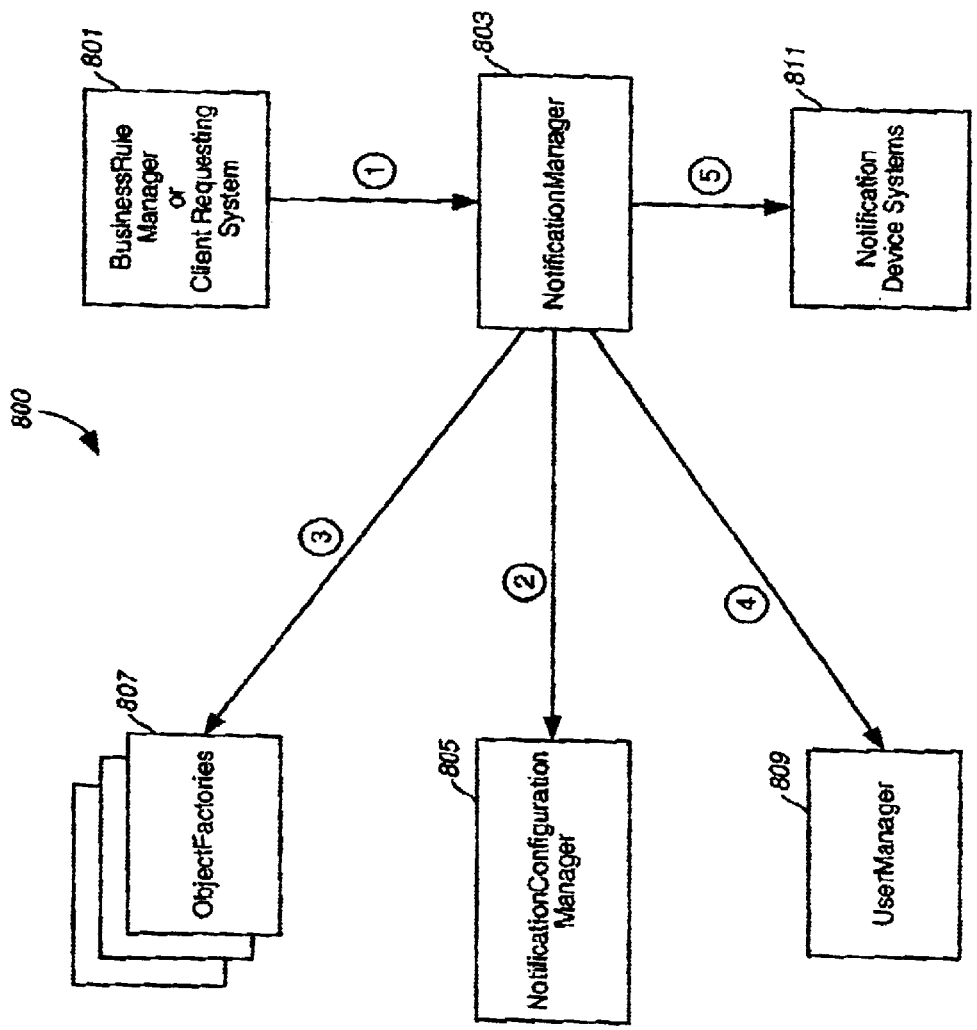
FIG. 6 is flow diagram of the notification services, according to an embodiment of the present invention.

FIG. 6 shows the interaction among the components of the NCMS 101 to generate notifications based upon business trigger points, according to an embodiment of the present invention. In step 1, in response to a business trigger point, a client requesting system 801 (i.e., client application or server proxy) calls a method on the Notification Manager 803, passing a reference ID, for example, to the business trigger point as well as other desired information such as the object reference(s), to other objects (e.g., Maintenance Request). Next, the Notification Manager 803, as in step 2, retrieves information related to the business trigger point from a notification configuration manager 805. The notification configuration manager 805 is further discussed below. The information that is retrieved includes notification templates as well as information from the templates; such as, the notification targets and notification messages and media devices. In step 3, the specific information is then retrieved from object factory server objects (ObjectFactory) 807 (i.e., Request Manager); the information may include the contact information and User IDs, such as the Requester and other parties as dictated by the notification templates. Based on the User IDs, the specific information is then requested from the User Manager server 809 (step 4). The final step (step 5) involves sending the compiled information to the targeted notification device system 811 (e.g., e-mail server, paging server, and/or fax server).

Further, the BRM 801 acts as the primary gateway to the Notification Manager server 803. The BRM 801 determines all key decisions and drives all notifications made by the system 800. This advantageously allows NCCO 113 to change services and business processes without changing any source code.

Figure 7:
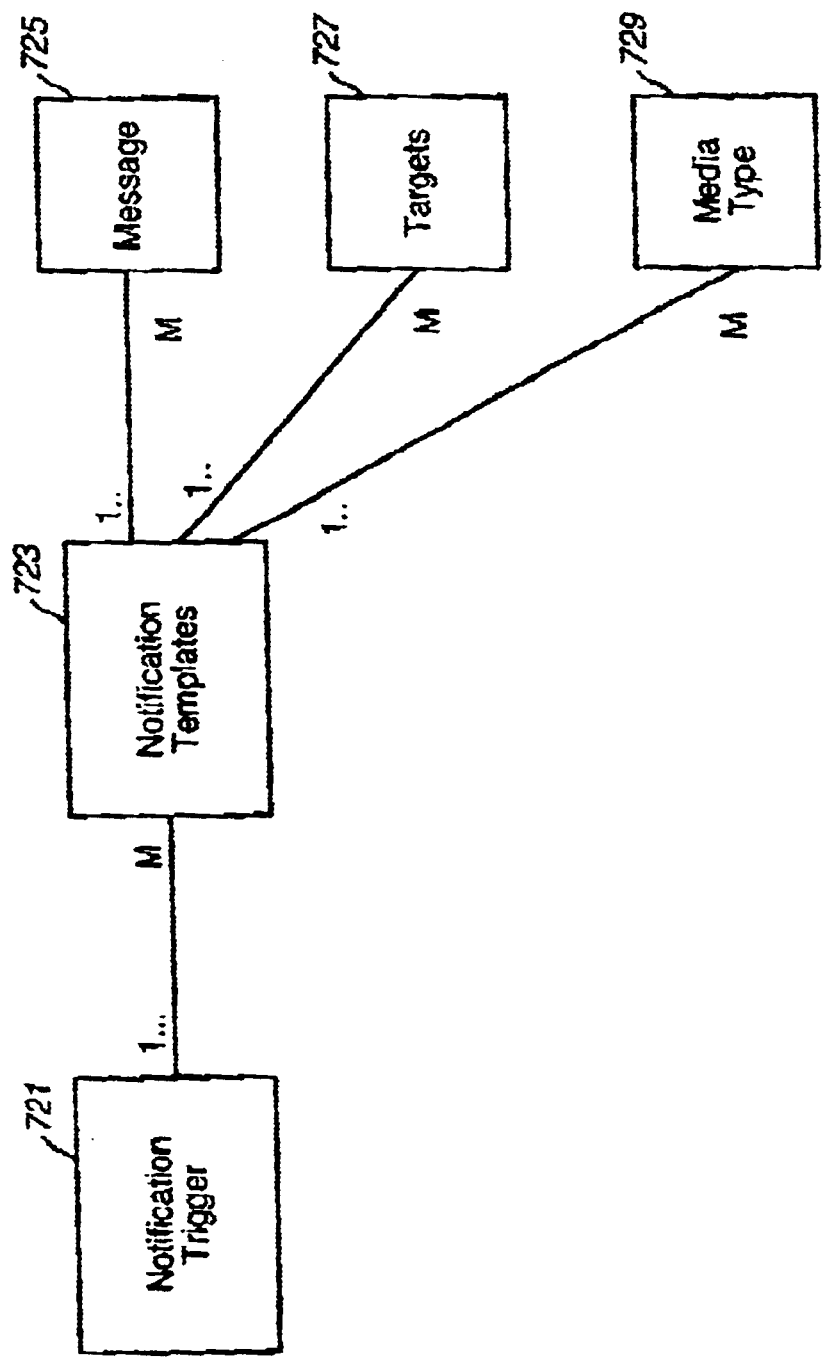
FIG. 7 is a diagram of the notification template elements, in accordance with the system of FIG. 1.

FIG. 7 shows the relationship between notification trigger points and notification templates, according to an embodiment of the present invention. As discussed above, a notification trigger is a trigger point 721 during business or system processing in which a notification is set to be sent upon the satisfaction of one or more predetermined conditions—the content and format of which is specified by a notification template 723. Each notification trigger point 721 in the system is represented by a NotificationTrigger object. As discussed, a NotificationTrigger is a transient object that provides total configuration control for a particular notification trigger point. According to one embodiment, several NotificationTrigger objects may exist at the same time, but only one object per notification trigger point may exist at any given time.

The notification templates 723 permits the following abstractions of the notification specifics: message 725, notification targets 727, and media types 729. Each notification template 723 in the NCMS 101 is represented by a notification template object (NotificationTemplate). Similar to the NotificationTrigger object, a NotificationTemplate is a transient object with total configuration control; in addition, several NotificationTemplate objects may be instantiated, but only one object per notification template 723 may exist at any given time. Each NotificationTemplate object has a collection of notification target objects (NotificationTarget), which identifies generically the categories of users to notify.

A Notification Configuration Manager object (NotificationConfigurationManager) provides the capability to define and modify the notification templates 723, associate each notification point with a notification template, and disable the sending of a notification at any notification trigger point 721. The notifications themselves are triggered and sent out by a NotificationManager object.

The NotificationConfigurationManager server object is activated as a CORBA shared server, ensuring that only one instance of this server exists to service any number of clients. As shown in the following figure, the NotificationConfigurationManager instantiates two helper objects for the configuration of the notification trigger points 721 and notification templates 723. Some of the NotificationConfigurationManager operations are enumerated in Table 6, below:

TABLE 6

| OPERATION | DESCRIPTION |
| --- | --- |
| OpenTriggers() | Gets all NotificationTrigger objects and returns their object references. |
| OpenTrigger() | Gets a NotificationTrigger object and returns its object reference. |
| GetTriggers() | Gets all NotificationTrigger objects and returns their attributes. |
| getTrigger() | Gets a NotificationTrigger object and returns its attributes. |
| GetUserGroups() | Gets all UserGroup objects and returns their attributes. |
| GetMessageTags() | Gets all MessageTag objects and return their attributes. |
| instance() | Gets the singleton instance of the NotificationConfigurationManager. |
| close() | Deallocates all the objects under the ownership of NotificationConfigurationManager and terminates. |

Figure 8A:
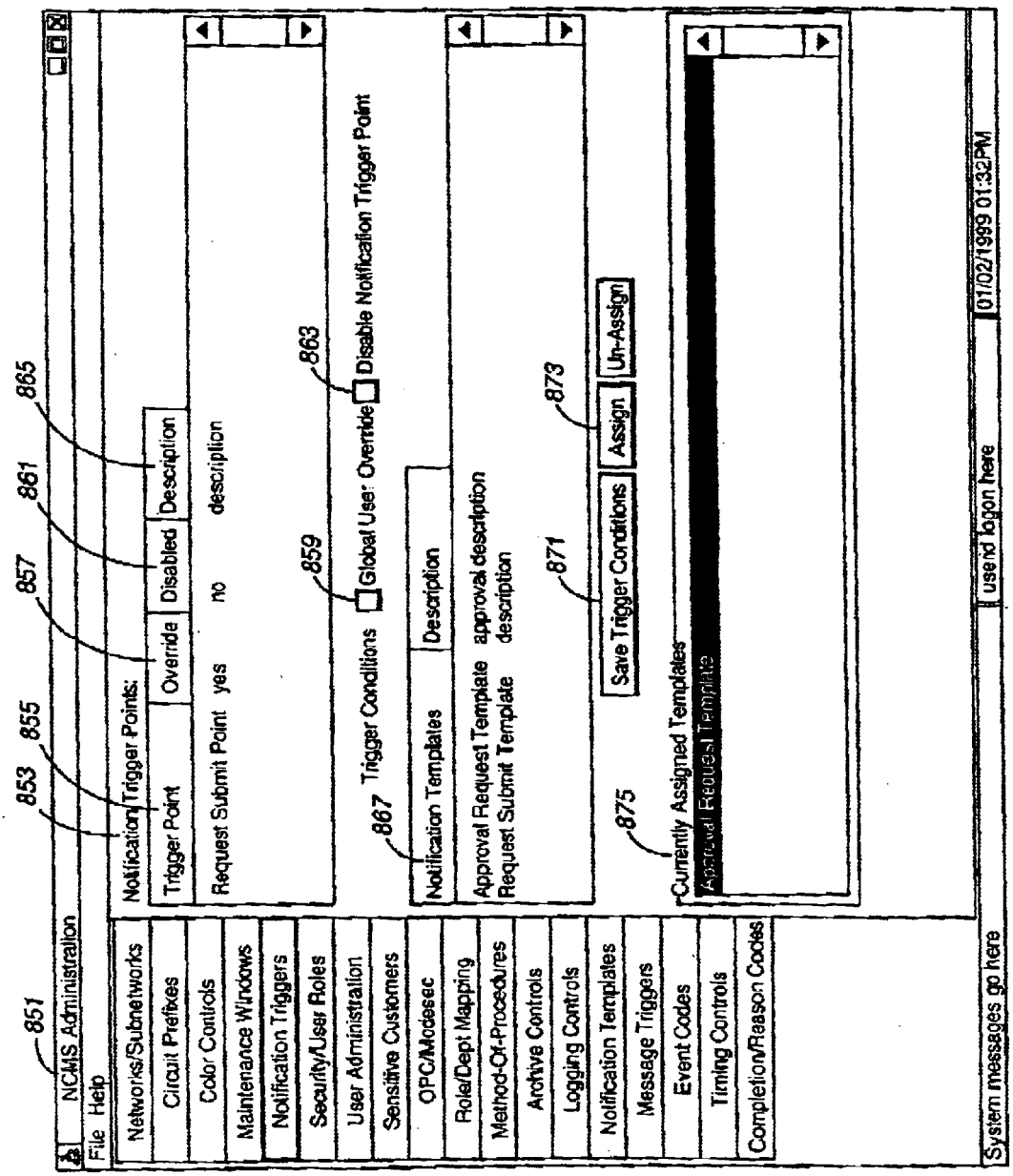
FIGS. 8a and 8b are diagrams of exemplary NCMS administration graphical user interface (GUI) screen displays, in accordance with the system of FIG. 1.

FIG. 8a illustrates an exemplary screen shot of an NCMS administrator terminal for manipulating notification trigger points, in accordance to an embodiment of the present invention. To access the notification triggers screen 851, a user must have administrator access rights or an appropriate role. The screen 851 displays all the trigger points 853 that are identified in the NCMS 101. The Trigger Point field 855 specifies the name of the notification trigger point. In addition, an Override field 857 indicates whether the trigger point should bypass a user supplied notification subscription filter criteria. As an attribute of the business trigger point, the Global User Override is used by the NCMS 101 to force users to receive the notification regardless of their subscription filters. This Override field 857 is set by a Global User Override box 859. In particular, if the Global User Override box 859 is set, the NCMS 101 bypasses all user supplied filtering and media type requests and use the template media type.

A Disabled field 861 specifies whether the trigger point has been disabled, which is accomplished using a Disable Notification Trigger Point box 863. The Disable Notification Trigger Point is used by the NCMS 101 to temporarily disable the business point from generating notifications. A Description field 865 provides a textual field for a description of the notification trigger point.

The GUI 851 further shows information regarding the notification templates that are being used in the NCMS 101. A Notification Template field 867 provides the name; an associated Description field 869 permits entry of textual information about the notification template. The GUI 851 also provides an ability to save changes to the notification triggers that have been modified via a Save Trigger Conditions button 871. An Assign button 873 permits the assignment of notification templates by the user. That is, the administrator can assign and unassign a notification template to trigger points. Currently assigned notification templates are displayed in a Currently Assigned Templates text box 875.

Figure 8B:
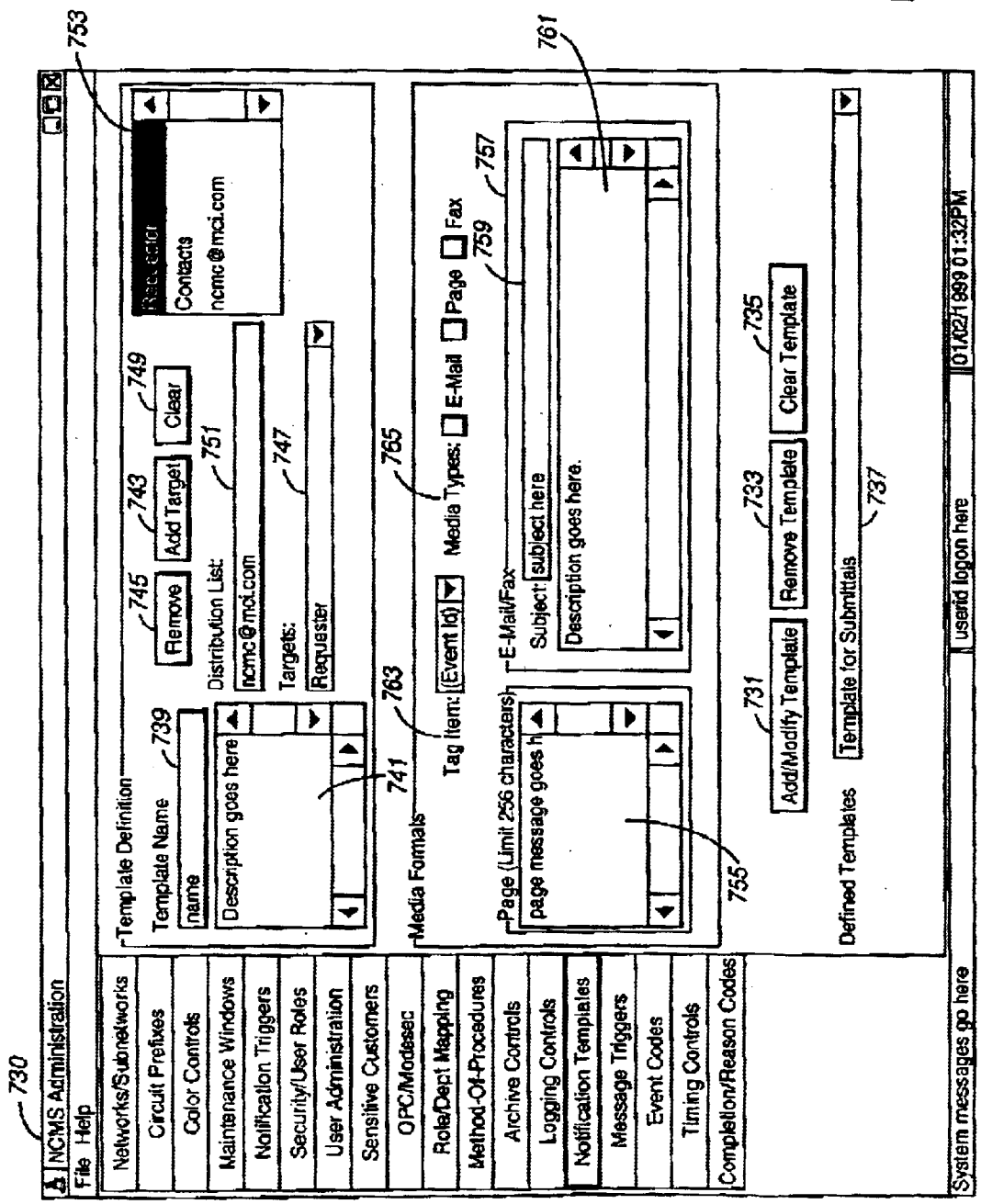

FIG. 8b illustrates an exemplary screen shot of an NCMS administrator terminal for manipulating notification templates, in accordance to an embodiment of the present invention. An administrator of the NCMS 101 (i.e., NCCO personnel) can assign and unassign notification templates 723 to trigger points. In addition, using the GUI 730, the administrator can create new notification templates 723; modify existing notification templates 723; or remove existing notification templates 723. To add or modify a template, the administrator selects an Add/Modify Template button 731. A Remove Template 733 button allows the administrator to delete the template; the Clear Template button 735 clears the fields of the template. A Defined Templates field 737 is a text description of the templates that have been created.

To create a new notification template, the administrator clicks on the Add/Modify Template button 731. Thereafter, the administrator types the name of the template in the single text line of the Template Name field 739. A description field 741 of the Template Name field 739 permits entry of a description of the template. The administrator can associate targets based on contact roles with the Events in the NCMS 101. Specifically, the administrator can add and/or remove contact targets by selecting the Add Target button 743 and the Remove contact 745 button. The Targets field 747 supplies an entry mechanism for the targets that are to be added or removed. The Targets field 747 can be cleared using the Clear button 749. Additionally, notification targets can be specified via a Distribution List field 751. A text box 753 displays all the targets as well as the distribution list. A Tag Item field 763 is also provided by GUI 730 to permit, in part, association with an Event.

Further, the GUI 730 accommodates a variety of media types that the notifications can be sent over. A Media Types field 765 specifies, in the exemplary embodiment of FIG. 8b, an E-mail box, Page box, and Fax box. With respect to e-mail and fax notifications, a Subject field 759 as well as a Description text box 761 are provided. If the notification is via page, a Page text box 755 allows an alphanumeric message up to a maximum text length (in this case 256 characters) to be captured.

Figure 9:
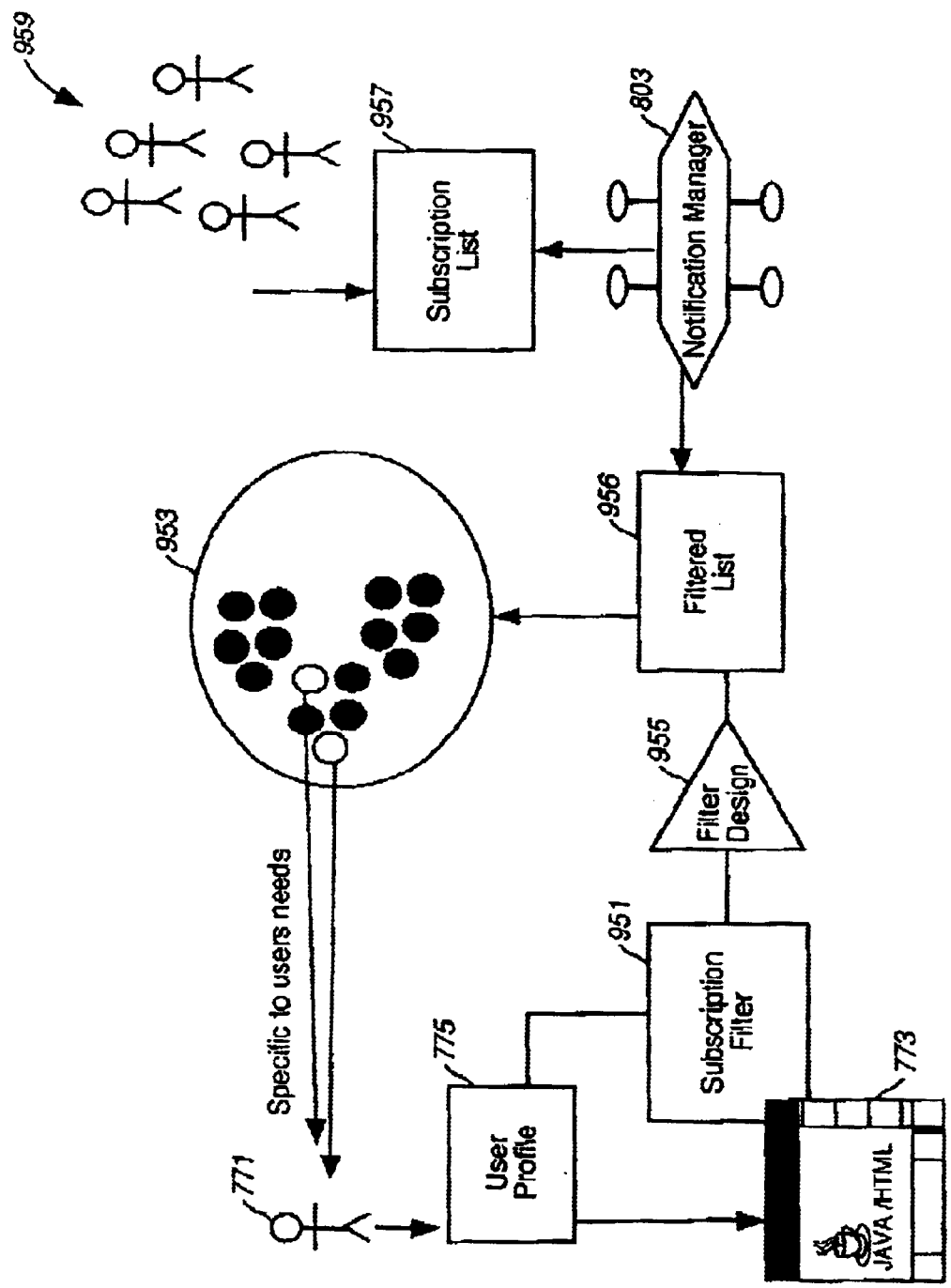
FIG. 9 is a diagram of the subscription filtering operation, in accordance with an embodiment of the present invention.

FIG. 9 shows the subscription filtering operation according to an embodiment of the present invention. The user 771 has a user profile 775 that has been created using an HTML client 773. Additionally, using the same client 773, the user 771 can design a subscription filter 951 to screen the types of notifications 953 that the user 771 wants to receive. This filtering capability enables the user 771 to prioritize the notifications 953, tailoring the notifications to meet specific needs of the user 771. For example, the user 771 may elect to receive only the most urgent notices during non-business hours. Once the subscription filter 951 is generated by the user 771, the actual filtering design code 955 generates a filtered list 956 that reflects the desired notifications 953 in accordance with the subscription filter 951.

However, as FIG. 9 shows, the Notification Manager 803 also has input into the filtered list 955 so that any notification trigger point that has the Global User Override attribute set supercedes the subscription filter criteria of the user 771. In this manner, the NCMS 101 has the capability to reach the user 771 irrespective of the user's subscription filter settings. This advantageously guards against the user inadvertently blocking highly critical notifications because of user error in setting the notification subscription filter 951. The Notification Manager 803 also maintains a subscription list 957, which specifies the notification targets 959. This capability is more fully discussed below with respect to FIG. 10.

Figure 10:
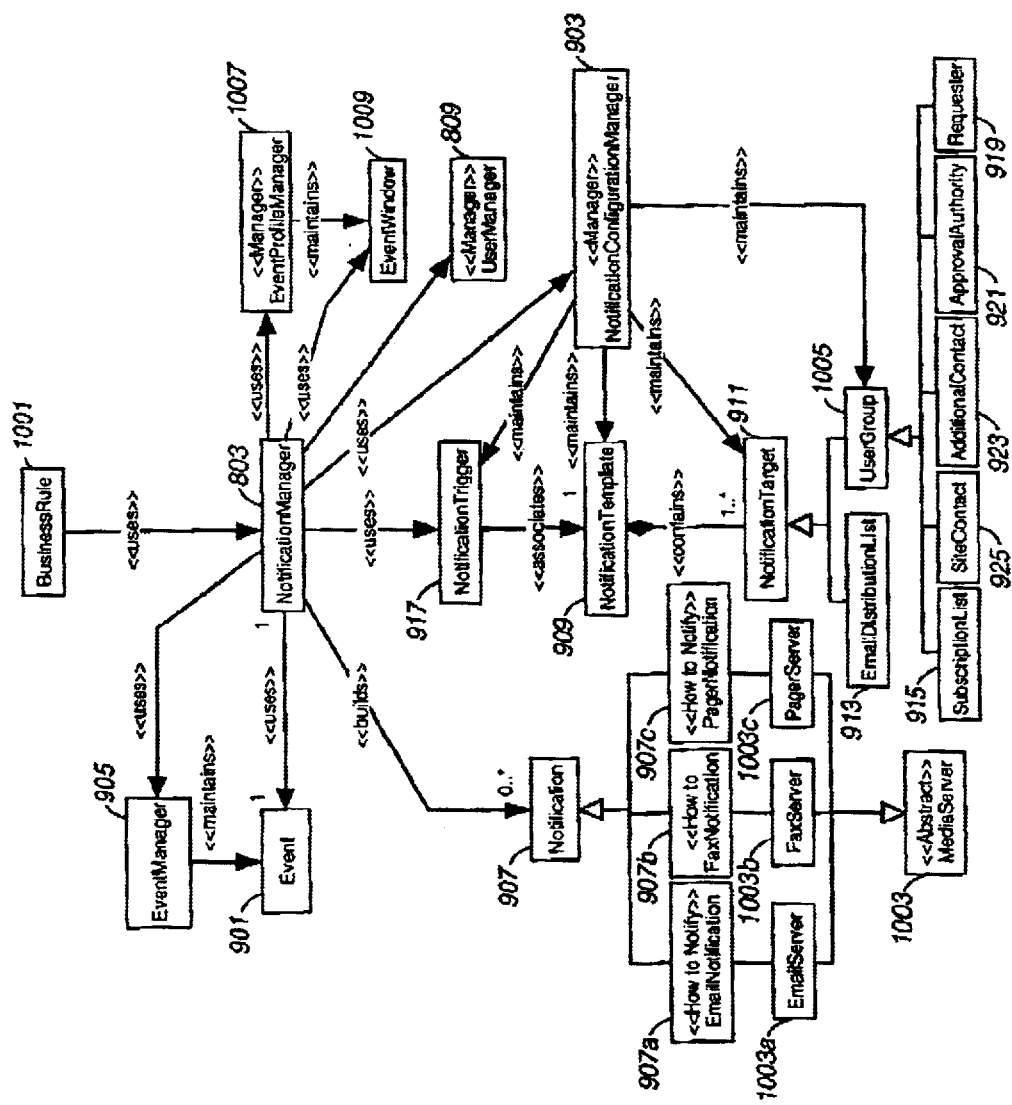
FIG. 10 is a notification domain class diagram, in accordance with an embodiment of the present invention.

FIG. 10 illustrates a notification domain class diagram in accordance with an embodiment of the present invention. The Notification Manager 803 is the only CORBA persistent object in this domain. Clients bind to Notification Manager object 803 and request that notifications be sent. The principal operations (which are based upon BusinessRule objects 1001) of the Notification Manager 803 include: SendSingleEventNotification( ),SendSingleNotificationE-mail( ),SendSingleNotificationFax( ), and SendSingleNotificationPager( ). The SendSingleEventNotification( ) operation is called to send notification for a single Event 901. The Notification Manager 803 interacts with the EventProfileManager object 1007, the EventWindow object 1009, and the UserManager object 809. The EventProfileManager 1007 is responsible for managing EventWindow objects 1009, which associate window rules that would affect a request from the Requester 919.

The Notification Manager 803 binds to the User Manager 809 object, the NotificationConfigurationManager 903 object, and the Event Manager 905 object. The User Manager 809 is a factory server is responsible for managing the user profiles identified in the system. The NotificationConfigurationManager server 903 is an administration factory server that holds the notifications and notification templates that are generated by the system. The Notification Manager 803 calls the Event Manager's OpenEvento operation to re-instantiate the Event 901. This is so there is a reference to the Event object 901 to retrieve contacts and attributes that are required in the notifiation. The Notification Manager 803 will create a Notification 907 object and set attributes (such as message) based on the given Notification trigger point 917 and the Event 901 information. Within the notification class object 907 are the following objects: EmailNotification object 907a, FaxNotification object 907b, and PagerNotification object 907c. These objects 907a–907c correspond to an EmailServer object 1003a, FaxServer object 1003b, and PagerServer object 1003c, respectively. The EmailServer object 1003a, FaxServer object 1003b, and PagerServer object 1003c are a part of the MediaServer object class 1003.

The Notification Manager 803 calls the GetNotification pointo operation of the NotificationConfigurationManager 903 to instantiate the given notification trigger point object 917. Using this notification trigger point object, the Notification Manager 803 invokes a GetTemplates( ) operation to get all notification templates 909 for the given Notification point 917. The notification template objects 909 hold the notification message, desired media device 1003, and notification targets 911. For each template, the GetTemplates( ) operation obtains a list of notification targets 911 (e.g., Requester, ApprovalAuthority, AdditionalContact, SiteContact, SubscriptionList, E-mailDistributionList 913) for the given notification template 909. E-mailDistributionList objects 913 represent any general purpose e-mail address that needs to be sent the notification.

If the Notification target list 911 contains the SubscriptionList target 915, the Notification Manager 803 calls the User Manager's GetSubscriptionListTarget( ) operation to get a list of User's e-mail, fax, or pager information that are subscribed to the given Notification trigger point 917, and have subscription filter criteria (i.e. network, template, circuit, site/location, customer) that match the given Event 901. The SubscriptionList target object 915 contains the list of user profiles that have subscribed to the Notification trigger point 917. Using this information the Notification Manager 803 updates the Notification object's attributes (such as DestinationName, E-mailAddress, etc.) and call the SendNotification( ) operation to actually send the notification. The NotificationTarget class 911 also includes the UserGroup objects 1005, which encompasses the following objects: SubscriptionList object 915, SiteContact object 925, AdditionalContact object 923, Approval/Authority object 921, and Requester object 919.

If the Notification target 911 list contains the Requester target 919, the Notification Manager 803 retrieves the Requester's UserID from the Event 901 and adds it to the UserID list. If the notification target list 911 contains the ApprovalAuthority target 921, the Notification Manager 803 gets a list of ApprovalAuthority UserIDs from the Event 901, adding to the UserID list. ApprovalAuthority objects 921 are managers or persons that are designated as persons who can approve or deny the Maintenance Request. Based on business rules and business policies these ApprovalAuthorities may be sent an e-mail requesting them to approve or reject the Maintenance Request. Also for ApprovalAuthority 921 and Notification target 911, an ApprovalNotificationVersion field must be incremented. If the Notification target 911 list contains the AdditionalContact target 923, the Notification Manager 803 obtains a list of AdditionalContact UserIDs from the Event and adds to the UserID list. The AdditionalContact object 923 represents any person the Maintenance Requester desires to get a notification about the status of the request.

If the Notification target list contains a SiteContact target, the Notification Manager 803 retrieves the list of SiteContact 925 UserID's from the Event 901, and Notification Manager 803 adds to the UserID list, accordingly. A Site-Contact object 925 represents a worker, general contact or field engineer at the Maintenance site identified in the Maintenance Request. The object contains the information (ie. Name and Phone number) provided by the Requester 919.

Once all the UserIDs are completed from the Event 901, Notification Manager 803 calls the User Manager's GetDistributionListTarget( ) operation to get a list of User's e-mail, fax, or pager information for each UserID. Thereafter, the Notification Manager 803 updates the notification object's attributes, calling the SendNotification( ) operation to send the notification.

Figure 11A:
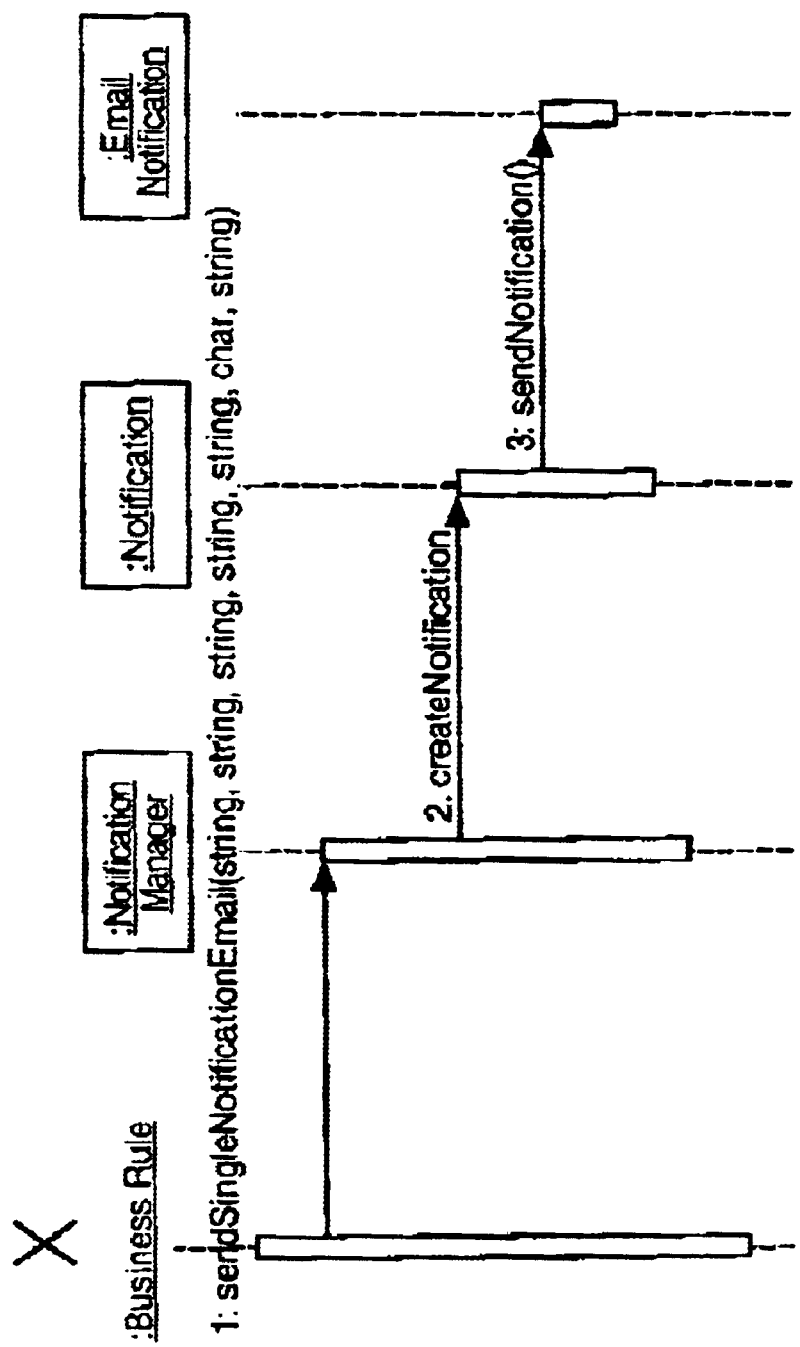
FIGS. 11a–11c are sequence diagrams of a send single event notification e-mail operation, a send single event notification fax operation, and a send single event notification pager operation, as performed by the system of FIG. 1.

FIG. 11a shows a sequence diagram for the sendSingleNotificationE-mail( ) operation, according to an embodiment of the present invention. This operation provides for the sending of a single manual/auto e-mail notification (step 1). In step 2, for a given e-mail notification information list (i.e. ToList, CcList, message, etc.), the Notification Manager 803 creates a Notification object 907 and populates the object's attributes (e.g., DestinationName, E-mailAddress, etc.). Next, the operation, as in step 3, calls the E-mailNotification (which is a subclass or extends Notification object) object's SendNotification( ) operation to actually send the notification.

Figure 11B:
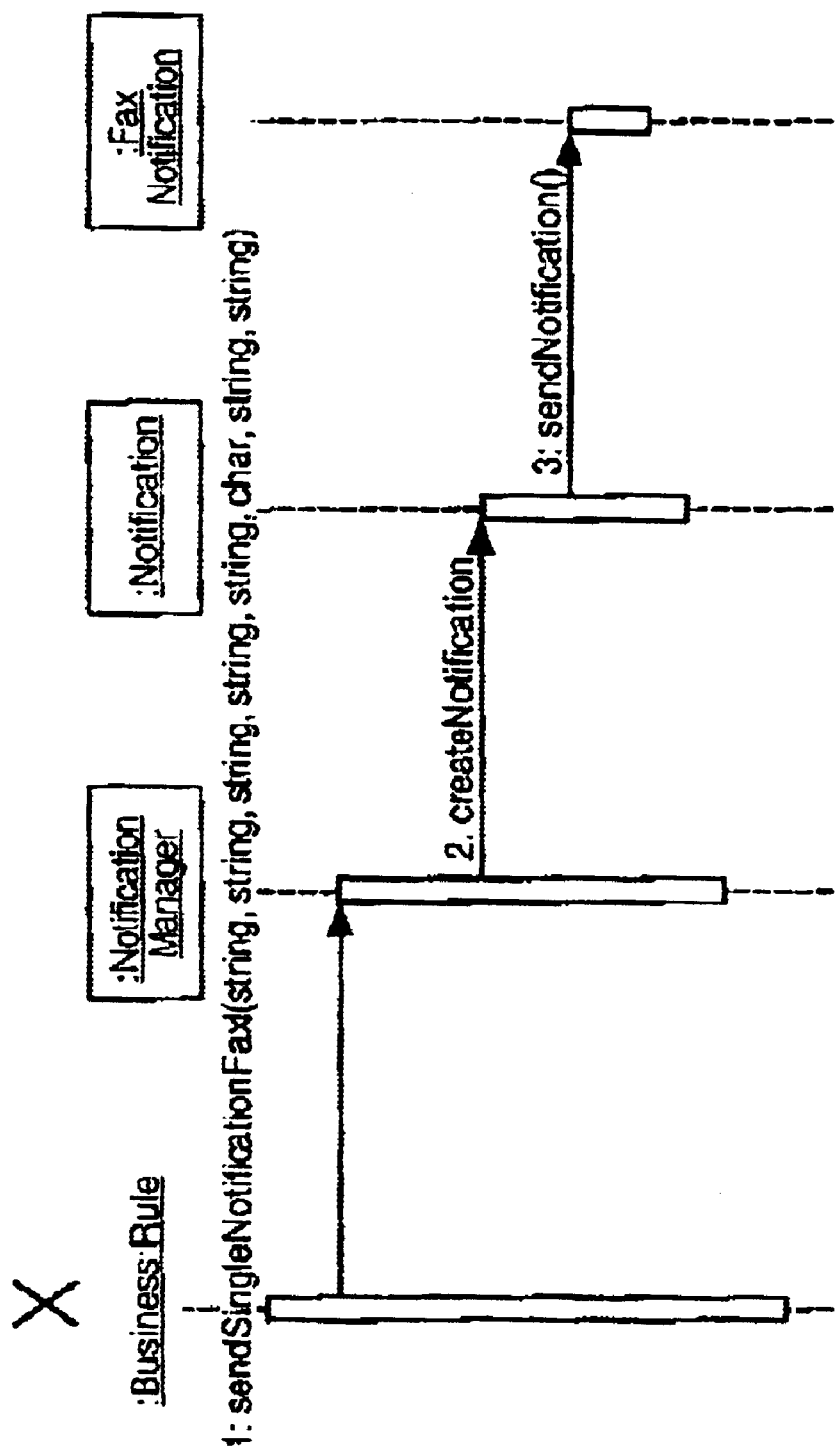

FIG. 11b is a sequence diagram of the sendSingleNotificationFax( ) operation, according to an embodiment of the present invention. This operation is invoked to send for a single manual/auto fax notification (step 1). For a given fax notification information list (i.e., ToList, CcList, message, faxnumber etc.), the Notification Manager 803, as in step 2, creates the Notification object 907 and populates the object's attributes (such as DestinationName, etc.). In step 3, the operation calls a SendNotification( ) operation of the FaxNotification object (which is a subclass or extends Notification object) to actually send the notification.

Figure 11C:
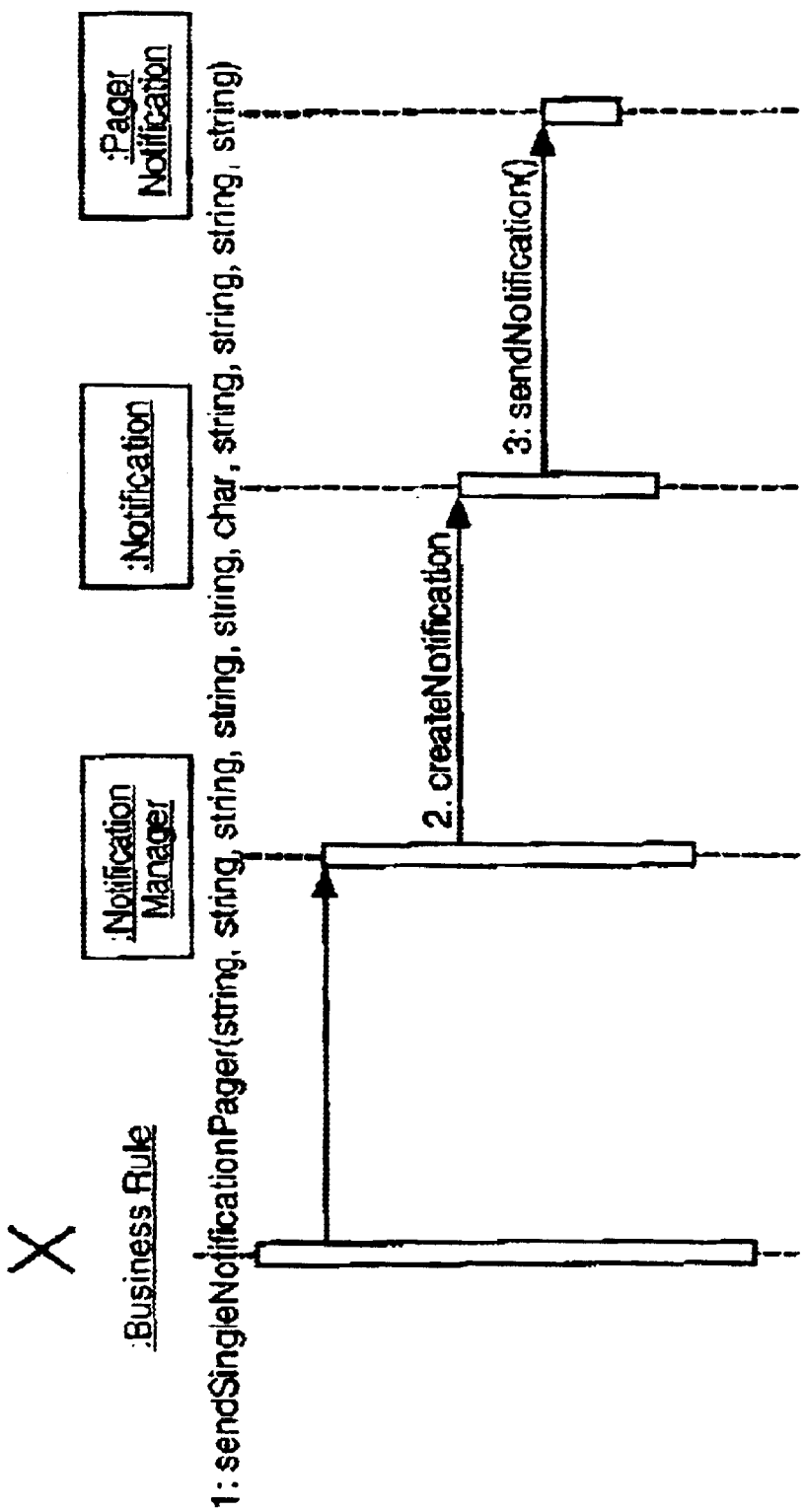

FIG. 11c is a sequence diagram of the sendSingleNotificationPager( ) operation, according to an embodiment of the present invention. The sendSingleNotificationPager( ) operation provides a single manual/auto pager notification (step 1). For a given pager notification information lists (e.g., ToList, CcList, pagermessage, pagernumber etc.), the Notification Manager 803, as in step 2, creates the Notification object 907 and populate the attributes of the object 907 (e.g., DestinationName, etc.). The operation calls the SendNotification( ) operation of the PagerNotification object (which is a subclass or extends Notification object) to actually send the notification (step 3).

Figure 12:
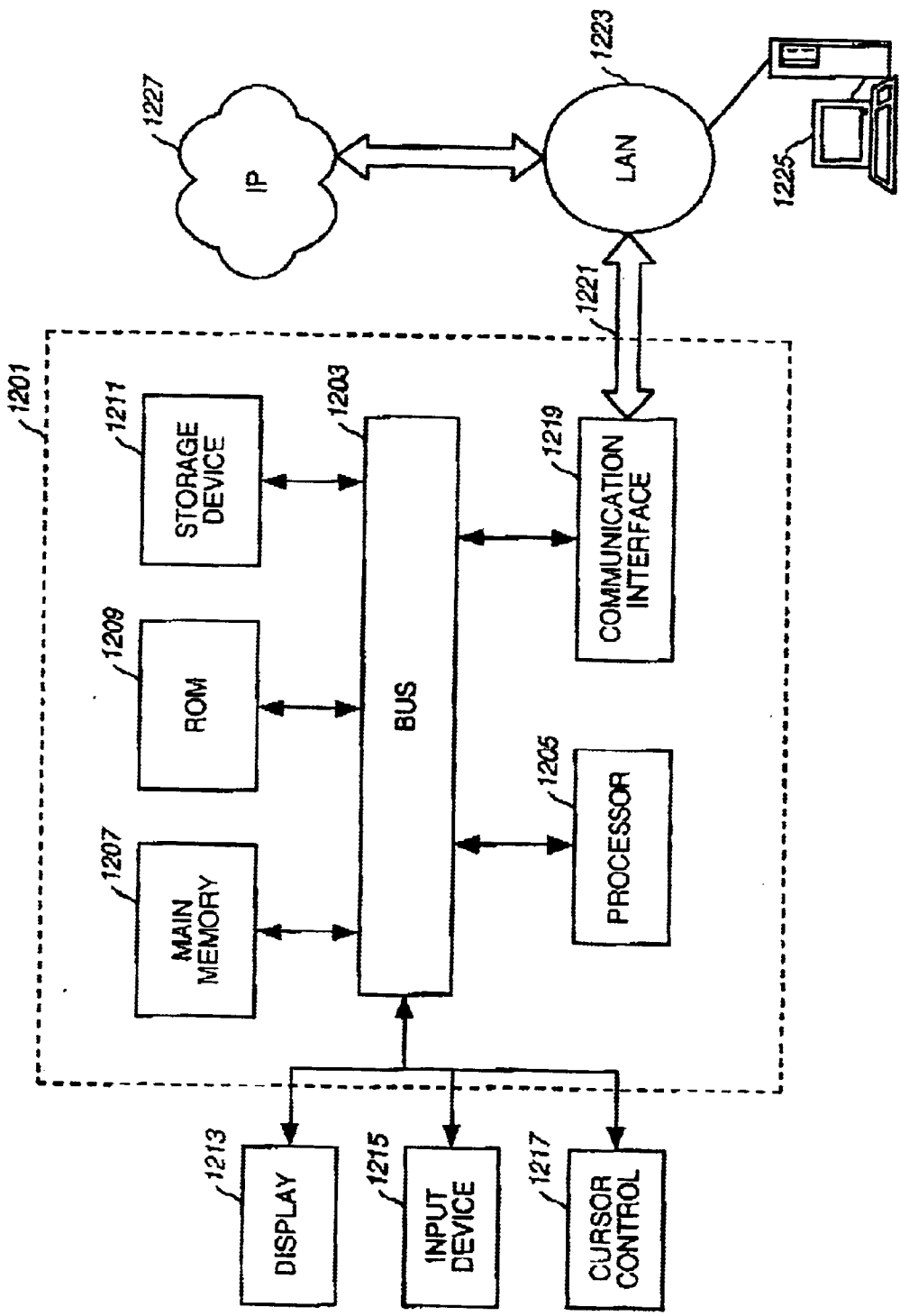
FIG. 12 is a diagram of a computer system that can perform in accordance with an embodiment of the present invention.

FIG. 12 illustrates a computer system 1201 upon which an embodiment according to the present invention may be implemented. Computer system 1201 includes a bus 1203 or other communication mechanism for communicating information, and a processor 1205 coupled with bus 1203 for processing the information. Computer system 1201 also includes a main memory 1207, such as a random access memory (RAM) or other dynamic storage device, coupled to bus 1203 for storing information and instructions to be executed by processor 1205. In addition, main memory 1207 may be used for storing temporary variables or other intermediate information during execution of instructions to be executed by processor 1205. Computer system 1201 further includes a read only memory (ROM) 1209 or other static storage device coupled to bus 1203 for storing static information and instructions for processor 1205. A storage device 1211, such as a magnetic disk or optical disk, is provided and coupled to bus 1203 for storing information and instructions.

Computer system 1201 may be coupled via bus 1203 to a display 1213, such as a cathode ray tube (CRT), for displaying information to a computer user. An input device 1215, including alphanumeric and other keys, is coupled to bus 1203 for communicating information and command selections to processor 1205. Another type of user input device is cursor control 1217, such as a mouse, a trackball, or cursor direction keys for communicating direction information and command selections to processor 1205 and for controlling cursor movement on display 1213.

According to one embodiment, mapping a set of object life cycle states to one or more sets of business rules is provided by computer system 1201 in response to processor 1205 executing one or more sequences of one or more instructions contained in main memory 1207. Such instructions may be read into main memory 1207 from another computer-readable medium, such as storage device 1211. Execution of the sequences of instructions contained in main memory 1207 causes processor 1205 to perform the process steps described herein. One or more processors in a multi-processing arrangement may also be employed to execute the sequences of instructions contained in main memory 1207. In alternative embodiments, hard-wired circuitry may be used in place of or in combination with software instructions. Thus, embodiments are not limited to any specific combination of hardware circuitry and software.

Further, the mapping of notifications to business rule triggers may reside on a computer-readable medium. The term "computer-readable medium" as used herein refers to any medium that participates in providing instructions to processor 1205 for execution. Such a medium may take many forms, including but not limited to, non-volatile media, volatile media, and transmission media. Non-volatile media includes, for example, optical or magnetic disks, such as storage device 1211. Volatile media includes dynamic memory, such as main memory 1207. Transmission media includes coaxial cables, copper wire and fiber optics, including the wires that comprise bus 1203. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1205 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 1201 can receive the data on the telephone line and use an infrared transmitter to convert the data to an infrared signal. An infrared detector coupled to bus 1203 can receive the data carried in the infrared signal and place the data on bus 1203. Bus 1203 carries the data to main memory 1207, from which processor 1205 retrieves and executes the instructions. The instructions received by main memory 1207 may optionally be stored on storage device 1211 either before or after execution by processor 1205.

Computer system 1201 also includes a communication interface 1219 coupled to bus 1203. Communication interface 1219 provides a two-way data communication coupling to a network link 1221 that is connected to a local network 1223. For example, communication interface 1219 may be a network interface card to attach to any packet switched local area network (LAN). As another example, communication interface 1219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1219 sends and receives electrical, electromagnetic or optical signals that carry digital data streams representing various types of information.

Network link 1221 typically provides data communication through one or more networks to other data devices. For example, network link 1221 may provide a connection through local network 1223 to a host computer 1225 or to data equipment operated by a service provider, which provides data communication services through an IP (Internet Protocol) network 1227 (e.g., the Internet). LAN 1223 and IP network 1227 both use electrical, electromagnetic or optical signals that carry digital data streams. The signals through the various networks and the signals on network link 1221 and through communication interface 1219, which carry the digital data to and from computer system 1201, are exemplary forms of carrier waves transporting the information. Computer system 1201 can transmit notifications and receive data, including program code, through the network (s), network link 1221 and communication interface 1219.

The techniques described herein provide several advantages over prior approaches to providing notification services. The present invention permits users of the system to subscribe to a notification trigger point and to apply notification subscription filters. Additionally, the separation of complex logic can be achieved, whereby the Notification is separated from specific code implementations and associated system processes. Once the business logic is separated from the implementation of the notification, the flexibility and reduction of cost can be achieved when business conditions change. When the framework is put into place and business conditions change, the only changes needed are to add, modify, or delete business rules which do not require a source code change.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A computer implemented method for providing notifications in a distributed object-oriented environment, the method comprising:

mapping one of the notifications to a notification trigger point, wherein the notification trigger point is based upon a business rule that corresponds to an object life cycle state of an object;

receiving a notification subscription request from a user to subscribe to one of the notification trigger points, the user having a user profile indicating a role of the user;

permitting the user to subscribe to the one notification trigger point based upon the role of the user;

filtering the notification based upon subscription filter criteria; and selectively sending one of the notifications to the subscribed user based upon the filtering step.

2. The method according to claim 1, wherein the subscription filter criteria in the filtering step comprise network information, location information, customer/circuit information, and a notification template.

3. The method according to claim 1, wherein the mapping step is performed by a business rule manager module.

4. The method according to claim 3, wherein the business rule manager module resides on a CORBA (Common Object Request Broker Architecture) server.

5. The method according to claim 1, further comprising generating the object by an event manager module.

6. The method according to claim 5, further comprising interacting by the event manager module with a client to provide real-time updates of the object.

7. The method according to claim 1, wherein the sending step and the filtering step are performed by a notification manager module.

8. The method according to claim 1, further comprising unsubscribing the user in response to an unsubscribe request by the user.

9. The method according to claim 1, wherein the notification trigger point in the step of mapping is grouped based upon a type of information the one notification is created from.

10. The method according to claim 1, wherein the object life cycle states in the mapping step comprise a creation state, a waiting review state, an Out-of-Guideline/Conflict state, a Denied/Cancelled state, an Approved state, an In Maintenance state, and a Completed state.

11. The method according to claim 1, further comprising monitoring the object by an object factory module.

12. A computer implemented system for providing notifications in a distributed object-oriented environment, the system comprising:

a server configured to transmit a notification subscription request initiated by a user;

a business rule manager module configured to map a business rule to a notification trigger point, the business rule corresponding to a business process at an object life cycle state of an object;

a user manager module configured to receive a notification subscription request from the user to subscribe to one of the notification trigger points, the user having a user profile indicating a role of the user and being permitted to subscribe to the one notification trigger point based upon the role; and a notification manager module configured to filter the notifications based upon subscription filter criteria and to send selectively one of the notifications.

13. The system according to claim 12, wherein the subscription filter criteria comprise network information, location information, customer/circuit information, and a notification template.

14. The system according to claim 12, wherein the business rule manager module resides on a CORBA (Common Object Request Broker Architecture) server.

15. The system according to claim 12, wherein the server is configured to set up a user profile.

16. The system according to claim 12, further comprising an event manager module configured to generate the object.

17. The system according to claim 16, wherein the event manager module interacts with the server to provide real-time updates of the object.

18. A computer-readable medium carrying one or more sequences of one or more instructions for providing notifications in a distributed object-oriented environment, the one or more sequences of one or more instructions including instructions which, when executed by one or more processors, cause the one or more processors to perform the steps of:

mapping one of the notifications to a notification trigger point, wherein the notification trigger point is based upon a business rule that corresponds to an object life cycle state of an object;

receiving a notification subscription request from a user to subscribe to one of the notification trigger points, the user having a user profile indicating a role of the user;

permitting the user to subscribe to the one notification trigger point based upon the role of the user;

filtering the notification based upon subscription filter criteria; and selectively sending one of the notifications to the subscribed user based upon the filtering step.

19. The computer-readable medium according to claim 18, wherein the subscription filter criteria in the filtering step comprise network information, location information, customer circuit information, and a notification template.

20. The computer-readable medium according to claim 18, wherein the mapping step and receiving step are performed by a business rule manager module.

21. The computer-readable medium according to claim 20, wherein the business rule manager module is a CORBA (Common Object Request Broker Architecture) service.

22. The computer-readable medium according to claim 18, further comprising generating the object by an event manager module.

23. The computer-readable medium according to claim 18, wherein the sending step and the filtering step are performed by a notification manager module.

* * * * *